(12) United States Patent
Chopra et al.

(10) Patent No.: US 12,099,418 B2
(45) Date of Patent: Sep. 24, 2024

(54) PREDICTIVE OPTIMAL QUEUE LENGTH MANAGEMENT FOR BACKUP SESSIONS USING DISTRIBUTED PROXIES

(71) Applicant: EMC IP Holding Company LLC, Hopkinton, MA (US)

(72) Inventors: Shelesh Chopra, Bangalore (IN); Rahul Deo Vishwakarma, Bangalore (IN); Sharath Talkad Srinivasan, Bengaluru (IN)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 86 days.

(21) Appl. No.: 17/198,386

(22) Filed: Mar. 11, 2021

(65) Prior Publication Data
US 2022/0292001 A1 Sep. 15, 2022

(51) Int. Cl.
*G06F 11/14* (2006.01)
*G06F 16/27* (2019.01)

(52) U.S. Cl.
CPC ...... *G06F 11/1484* (2013.01); *G06F 11/1451* (2013.01); *G06F 11/1464* (2013.01); *G06F 11/1469* (2013.01); *G06F 16/27* (2019.01)

(58) Field of Classification Search
CPC .. G06F 11/14; G06F 11/1448; G06F 11/1451; G06F 11/1458; G06F 11/1461; G06F 11/1464; G06F 11/1469; G06F 11/1484; G06F 11/2023; G06F 16/122; G06F 16/185; G06F 16/27; G06F 16/273; G06F 16/275; G06F 16/278
See application file for complete search history.

(56) References Cited

U.S. PATENT DOCUMENTS

| | | | | |
|---|---|---|---|---|
| 9,069,482 B1* | 6/2015 | Chopra | | G06F 11/1464 |
| 9,639,428 B1* | 5/2017 | Boda | | G06F 11/1484 |
| 10,055,309 B1* | 8/2018 | Samad | | G06F 9/45558 |
| 10,289,441 B1* | 5/2019 | Chopra | | G06F 11/301 |
| 10,511,514 B1* | 12/2019 | Vytla | | H04L 43/0852 |
| 10,579,283 B1* | 3/2020 | Chopra | | G06F 3/065 |
| 10,735,540 B1* | 8/2020 | Sharma | | H04L 67/56 |
| 2015/0081773 A1* | 3/2015 | Ansel | | G06F 16/958 707/639 |
| 2015/0379009 A1* | 12/2015 | Reddy | | G06F 16/2343 707/747 |

(Continued)

*Primary Examiner* — Robert W Beausoliel, Jr.
*Assistant Examiner* — Cheryl M Shechtman
(74) *Attorney, Agent, or Firm* — Chamberlain, Hrdlicka, White, Williams & Aughtry; Aly Z. Dossa

(57) ABSTRACT

Techniques described herein relate to methods and systems for managing backup operations. The method may include receiving a request to perform a first backup operation for a first virtual machine (VM); making a first determination, using a vProxy preference map, that a first vProxy is assigned to the first VM based on a backup capability associated with the first vProxy; making a second determination that the first vProxy is not available to perform the first backup operation; making a third determination, based on the second determination and using a vProxy information database, that a second vProxy is available to perform the first backup operation based on the second vProxy being associated with the same backup capability as the first vProxy; and performing the first backup operation using the second vProxy.

17 Claims, 9 Drawing Sheets

(56) References Cited

U.S. PATENT DOCUMENTS

| | | | | |
|---|---|---|---|---|
| 2016/0085580 | A1* | 3/2016 | Toeroe | G06F 9/5077 |
| | | | | 718/1 |
| 2016/0371153 | A1* | 12/2016 | Dornemann | G06F 11/1458 |
| 2019/0179717 | A1* | 6/2019 | Juniwal | G06F 9/45558 |
| 2019/0220364 | A1* | 7/2019 | Yu | G06F 11/1451 |
| 2020/0012574 | A1* | 1/2020 | Srinivasan | G06F 11/1464 |
| 2020/0319799 | A1* | 10/2020 | Mayer | G06F 3/061 |
| 2022/0179558 | A1* | 6/2022 | Chopra | G06F 3/0673 |

* cited by examiner

| VM | Preferred vProxy | Previous vProxy | Special Requirements | Recommendation |
|---|---|---|---|---|
| A | 1 | 7 | 20 concurrent sessions | Share only if session requirement is met |
| | 2 | 8 | | |
| B | 3 | 3 | N/A | Share vProxy |
| C | 4 | 10 | Critical App | Exclusive vProxy |
| D | 5 | 11 | N/A | Share vProxy |
| E | 6 | 15 | Large Dataset | Use high CPU/memory vProxy exlusively | vProxy Preference Map 300

FIG. 3A

| vProxy | Capability | VM Mapping | Current Status |
|---|---|---|---|
| 1 | High Concurrency | A | Healthy |
| 2 | High Concurrency | A | Healthy |
| 3 | N/A | B | Healthy |
| 4 | Critical App Ready | C | Healthy |
| 5 | N/A | D | Healthy |
| 6 | Large Dataset | E | Unhealthy |
| ... | ... | ... | ... |
| 15 | Large Dataset | None | Healthy |
| 16 | Critical App Ready | None | Healthy |
| 17 | High Concurrency | None | Unhealthy |
| 18 | High Concurrency | None | Healthy | vProxy Information Database 310

PREDICTIVE OPTIMAL QUEUE LENGTH MANAGEMENT FOR BACKUP SESSIONS USING DISTRIBUTED PROXIES

BACKGROUND

Computing devices often exist in virtualization environments that include one or more virtualization management devices. Virtualization management devices may be used for managing any number of virtualization hosts. Such hosts may have any number of virtual machines (VMs) deployed on them. Such virtual machines may be backed up to or restored from time to time, and/or at scheduled times. Backup and restore operations may be managed by a backup and restore management device, which may use proxy VMs within the virtualization environment to transmit or receive data to perform the relevant operation. However, the health of the proxy chosen for a backup or restore operation is not considered when the proxy is selected to perform the operation. Similarly, the performance of a proxy (e.g., data throughput) and/or the characteristics of the proxy are not considered when the proxy is selected to perform the operation. Instead, other schemes are used to select the proxy, such as random selection. Additionally, when a given proxy is assigned to a VM for performing backup or restore operations, the vProxy may not be available to perform the operation at a later time at which the operation is requested.

SUMMARY

In general, certain embodiments described herein relate to a method for managing backup operations. The method may include receiving a request to perform a first backup operation for a first virtual machine (VM); making a first determination, using a vProxy preference map, that a first vProxy is assigned to the first VM based on a backup capability associated with the first vProxy; making a second determination that the first vProxy is not available to perform the first backup operation; making a third determination, based on the second determination and using a vProxy information database, that a second vProxy is available to perform the first backup operation based on the second vProxy being associated with the same backup capability as the first vProxy; and performing the first backup operation using the second vProxy.

In general, certain embodiments described herein relate to a non-transitory computer readable medium that includes computer readable program code, which when executed by a computer processor enables the computer processor to perform a method for managing backup operations. The method may include receiving a request to perform a first backup operation for a first virtual machine (VM); making a first determination, using a vProxy preference map, that a first vProxy is assigned to the first VM based on a backup capability associated with the first vProxy; making a second determination that the first vProxy is not available to perform the first backup operation; making a third determination, based on the second determination and using a vProxy information database, that a second vProxy is available to perform the first backup operation based on the second vProxy being associated with the same backup capability as the first vProxy; and performing the first backup operation using the second vProxy.

In general, certain embodiments described herein relate to a system for managing backup operations. The system may include a backup and restore management device comprising a processor, a memory device, a storage device, and a backup operation analyzer. The backup operation analyzer, includes circuitry, and is configured to: receive a request to perform a first backup operation for a first virtual machine (VM); make a first determination, using a vProxy preference map, that a first vProxy is assigned to the first VM based on a backup capability associated with the first vProxy; make a second determination that the first vProxy is not available to perform the first backup operation; make a third determination, based on the second determination and using a vProxy information database, that a second vProxy is available to perform the first backup operation based on the second vProxy being associated with the same backup capability as the first vProxy; and perform the first backup operation using the second vProxy.

Other aspects of the embodiments disclosed herein will be apparent from the following description and the appended claims.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

FIG. 3A and FIG. 3B show an example in accordance with one or more embodiments of the invention.

DETAILED DESCRIPTION

Figure 1A:
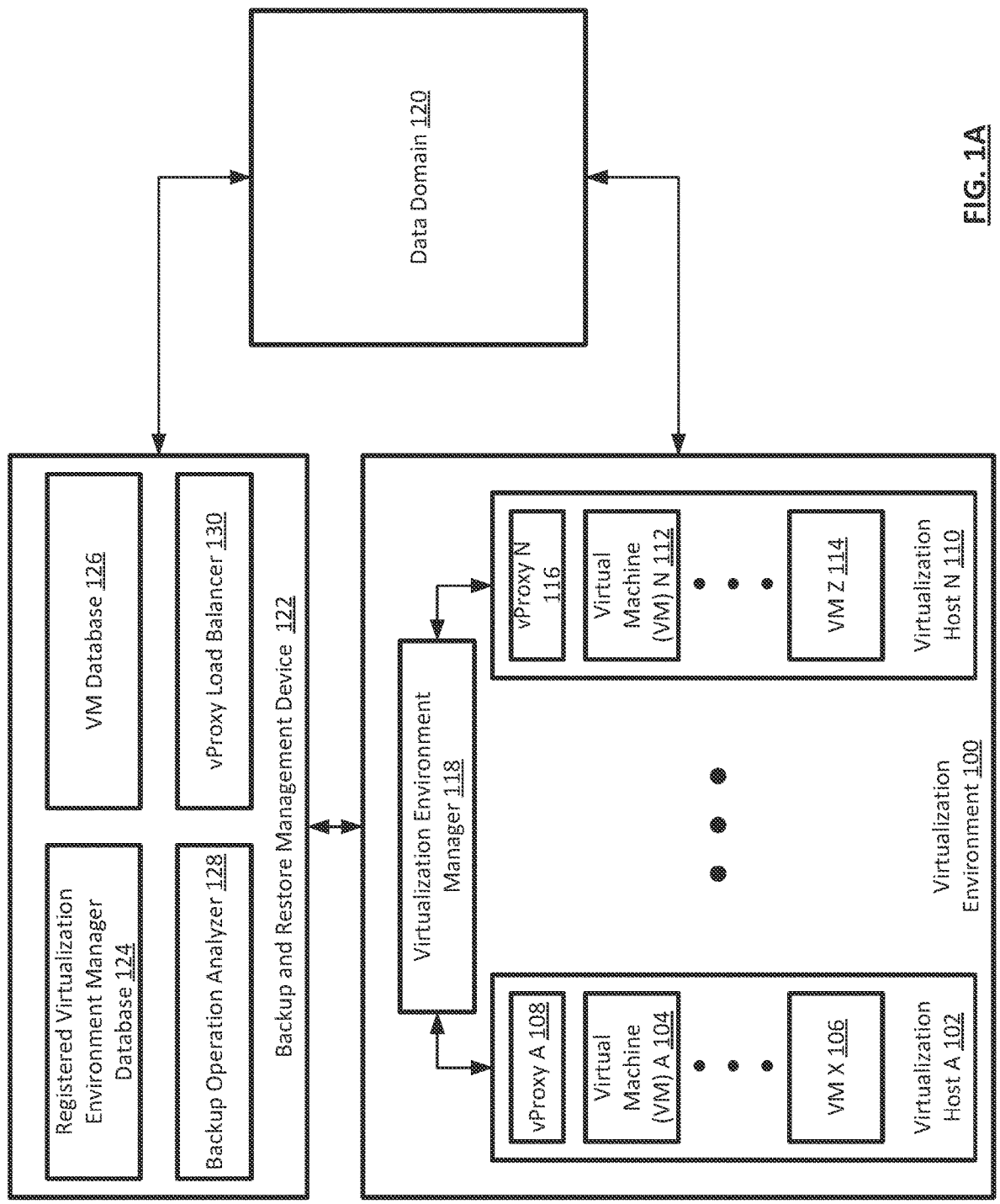
FIG. 1A shows a diagram of a system in accordance with one or more embodiments of the invention.

Specific embodiments will now be described with reference to the accompanying figures.

In the below description, numerous details are set forth as examples of embodiments described herein. It will be understood by those skilled in the art, that have the benefit of this Detailed Description, that one or more embodiments of the embodiments described herein may be practiced without these specific details and that numerous variations or modifications may be possible without departing from the scope of the embodiments described herein. Certain details known to those of ordinary skill in the art may be omitted to avoid obscuring the description.

In the below description of the figures, any component described with regard to a figure, in various embodiments described herein, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments described herein, any description of the components of a figure is to be interpreted as an optional embodiment, which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

As used herein, the phrase operatively connected, or operative connection, means that there exists between elements/components/devices a direct or indirect connection that allows the elements to interact with one another in some way. For example, the phrase 'operatively connected' may refer to any direct connection (e.g., wired directly between two devices or components) or indirect connection (e.g., wired and/or wireless connections between any number of devices or components connecting the operatively connected devices). Thus, any path through which information may travel may be considered an operative connection.

In general, embodiments described herein relate to methods, systems, and non-transitory computer readable mediums storing instructions for assessing the relative health of vProxies, and the performance of vProxies, and making information relating to the health and performance of such devices available for use when backup and/or restore operations for virtual machines (VMs) are to be performed.

Backup and restore operations are important tasks for successful data protection. To perform backup and/or restore of VMs, a proxy VM (vProxy) may be used to offload at least a portion of the workload of data transmission to and/or from backup storage devices (e.g., a data domain) to the vProxy. A vProxy may be a relatively small VM in which an operating system executes and manages software configured to perform backup and/or restore operations, which may include causing data related to VMs to be copied to a data domain (e.g., a VM backup) or to be restored from a data domain (e.g., a VM restore). In one or more embodiments, a vProxy is packaged as a virtual appliance (e.g., in an .ovf format).

However, using a vProxy currently has limitations. For example, vProxies are often assigned (or manually selected) randomly, without consideration of the capabilities, health, performance, characteristics (e.g., number of processors, amount of memory, etc.), current usage, etc. of the vProxies. Therefore, even though more sessions may be available in a first vProxy as compared to a second vProxy, the second vProxy may be used for backing up a new VM, which may adversely affect backup and/or restore performance by forcing at least some portion of the backup operation to have to be queued. As another example, underlying issues and/or ongoing activity may cause a given vProxy to have a relatively lower throughput (or available throughput) with respect to data transfer, but that vProxy may still be selected to perform a backup or restore operation over a vProxy with better throughput performance and/or availability. Additionally, backup and/or restore of a VM may be performed with using a variety of data transport modes (e.g., hotadd, network block device (NBD), etc.). Currently, vProxy allocation does not differentiate between such transport modes.

Embodiments described herein may generate a list of available healthy vProxies, which are vProxies that have a health score above a health score threshold. In one or more embodiments, such a list also includes a label of optimal or non-optimal, which may be determined, for example, by assessing whether the throughput of data transferred by each healthy vProxy is above or below a throughput threshold (e.g., one terabyte (TB) per hour (hr) (TB/hr)), which may be the average throughput over a defined amount of time and/or number of previous backup jobs performed. In one or more embodiments, the vProxies are ranked according to respective heath scores and throughput performance for performing backup and restore operations.

In one or more embodiments, vProxies are also assessed based on their health, throughput, and other characteristics (e.g., number of processors, amount of memory, etc.) to determine one or more backup capabilities for which the vProxy is suited, such as high concurrency, large dataset backup, critical VM backup, etc. In one or more embodiments, VMs are also assessed to determine whether they have any special backup requirements. In one or more embodiments, VMs are assigned to one or more preferred vProxies for backup operations based on the requirements of the VM matching the capabilities of the vProxy. In one or more embodiments, at the time a backup operation is to be performed, a determination is made as to whether the one or more preferred vProxies are available to perform the backup operation. In one or more embodiments, if the preferred vProxy is available, then it is used to perform the backup operation. In one or more embodiments, if the preferred vProxy is not available, then a determination may be made as to whether there is another vProxy available with the same or similar backup capability. In one or more embodiments, if there is such a vProxy, then it may be selected to perform the backup operation. In one or more embodiments, if there is no vProxy available with the desired backup capability, then an alternate vProxy may be selected to perform the backup operation, which may result in a less optimal backup than may have been performed using a preferred or similar vProxy.

In one or more embodiments, data items related to the health of vProxies and virtualization hosts are obtained by a backup operation analyzer. In one or more embodiments, the data items are stored in a time series database to be used in analyzing the health of the vProxies, which may depend, at least in part, on the health of the virtualization host on which a given vProxy executes. In one or more embodiments, the backup operation analyzer performs a clustering analysis to create two clusters of vProxies, which are then labeled high (i.e., high health) and low (i.e., low health). In one or more embodiments, a confidence analysis is then performed (e.g., using a transductive confidence machine) to assign a confidence score to the labels (i.e., high or low) assigned to each vProxy and virtualization host. In one or more embodiments, the confidence scores for the vProxies assigned a high label are then ranked from highest to lowest.

In one or more embodiments, the throughput of each vProxy is measured to determine a throughput value. In one or more embodiments, the throughput is the amount of VM data that a vProxy transfers (either baking up or restoring) per unit time (e.g., per hour). The throughput for a vProxy may be an average throughput (e.g., average for the last day, week, month, etc.) and/or the average over a defined number of prior backup and/or restore jobs (e.g., average over the last three backup jobs performed). In one or more embodiments, from among the vProxies having a healthy label with a confidence score above a confidence score threshold, the throughput may be assessed to determine if it is over a throughput threshold (e.g., 1 TB/hr). In one or more embodiments, if the throughput for a given vProxy is at or above the throughput threshold, then the vProxy may be labeled optimal, while the vProxies for which the threshold is below the throughput threshold are labeled non-optimal. Thus, in one or more embodiments, a list of vProxies is obtained that includes whether a vProxy is healthy, the confidence in the health assessment, and whether or not a vProxy is optimal based on throughput. Other characteristics of a vProxy may also be assessed, such as number of sessions (i.e., concurrent backup jobs) it is configured to perform, the number of processors it is configured with, the amount of memory it is configured with, etc. The information related to a given vProxy may be used to characterize whether the vProxy should be labeled as having any special capability. For example, a vProxy configured with a high number (e.g., twenty) concurrent backup session capability may be labeled as able to support high concurrency. As another example, a vProxy having a large amount of processors and/or memory may be labeled as having a capability of performing backups for VMs that have a large amount of data (e.g., greater than one TB).

In one or more embodiments, when an entity (e.g., administrator, backup scheduling software, etc.) seeking to configure and/or perform a backup or restore operation requests the operation, an appropriate vProxy having a capability that matches the requirements of a VM to be backed up may be assigned. Additionally or alternatively, if the entity chooses a vProxy manually, the user interface may present to the entity alternate suggestions for a vProxy better suited to perform the backup operation than the one selected by the entity.

For example, if the backup operation is of critical importance, then the most optimal vProxy may be assigned, and set to exclusively perform a backup of the critical VM when such a backup is to occur. Similarly, if the backup of the VM is less critical, a less optimal vProxy may be assigned to perform the backup or restore operation, thereby not adding a backup burden on a more optimal vProxy, which may subsequently be needed for a more critical backup operation.

In one or more embodiments, the assessment of whether a vProxy is optimal or non-optimal at a given point in time may be stored for each vProxy assessed. In one or more embodiments, the assessments are stored in a time series database. In one or more embodiments, a number of assessments, which may be automatically chosen or be configured/configurable, are used to determine a suggested action for each VM. For example, if a given vProxy has been assessed as non-optimal for the past three assessments, then the vProxy may be labeled with a delete suggestion, which may be presented to an entity managing a virtualization environment. Other suggested actions may include, but are not limited to, keep (when a vProxy has been assessed as optimal for a certain number of assessments), and warning (when a vProxy has been optimal and non-optimal over a given number of assessments). In one or more embodiments, the suggested actions may allow an entity managing a virtualization environment to make more informed decisions when managing the vProxies of a virtualization environment. In one or more embodiments, the suggested action may be automated. For example, an entity managing a virtualization environment may allow for the automatic deletion of vProxies that receive a delete suggestion as the suggested action.

FIG. 1A shows a diagram of a system in accordance with one or more embodiments described herein. The system may include a virtualization environment (100). The virtualization environment (100) may include a virtualization environment manager (118) and any number of virtualization hosts (e.g., virtualization host A (102), virtualization host N (110)). Virtualization host A (102) may include vProxy A (108) and any number of VMs (e.g., VM A (104), VM X (106)). Virtualization host N (110) may include vProxy N (116) and any number of VMs (e.g., VM N (112), VM Z (114)). The system may also include a backup and restore management device (122). The backup and restore management device (122) may include a registered virtualization environment manager database (124), a VM database (126), a backup operation analyzer (128), and a vProxy load balancer (130). The system may also include a data domain (120). Each of these components is described below.

In one or more embodiments, the virtualization hosts (102, 110) are computing devices of any type located in a common virtualization environment (100), such as, for example, all or any portion of a data center. In one or more embodiments, a virtualization environment (100) is any environment in which any number of computing devices, such as virtualization host A (102) and virtualization host N (110), are subject, at least in part, to a shared scheme pooling compute resources for use in deploying virtualized computing device instances (e.g., VMs, containers, emulators, etc.).

In one or more embodiments, the virtualization hosts (e.g., 102, 110) within the virtualization environment (100) may be any single computing device, collection of computing devices, portion of one or more computing devices, or any other logical grouping of computing resources (e.g., a hyper-converged infrastructure).

In one or more embodiments, a computing device is any device, portion of a device, or any set of devices capable of electronically processing instructions and may include any number of components, which include, but are not limited to, any of the following: one or more processors (e.g. components that include integrated circuitry) (not shown), memory (e.g., random access memory (RAM)) (not shown), input and output device(s) (not shown), non-volatile storage hardware (e.g., solid-state drives (SSDs), hard disk drives (HDDs) (not shown)), one or more physical interfaces (e.g., network ports, storage ports) (not shown), any number of other hardware components (not shown), and/or any combination thereof.

Examples of computing devices include, but are not limited to, a server (e.g., a blade-server in a blade-server chassis, a rack server in a rack, etc.), a desktop computer, a mobile device (e.g., laptop computer, smart phone, personal digital assistant, tablet computer, automobile computing system, and/or any other mobile computing device), a storage device (e.g., a disk drive array, a fibre/fiber channel storage device, an Internet Small Computer Systems Interface (iSCSI) storage device, a tape storage device, a flash storage array, a network attached storage device, etc.), a network device (e.g., switch, router, multi-layer switch, etc.), a virtual machine, a logical container (e.g., for one or more applications), and/or any other type of computing device with the aforementioned requirements.

In one or more embodiments, any or all of the aforementioned examples may be combined to create a system of such devices, which may collectively be referred to as a virtualization host (102, 110) (e.g., a set of blade servers in a blade server rack). Other types of computing devices may be used without departing from the scope of the embodiments described herein.

In one or more embodiments, the non-volatile storage (not shown) and/or memory (not shown) of a computing device or system of computing devices may be one or more data repositories for storing any number of data structures storing any amount of data (i.e., information). In one or more embodiments, a data repository is any type of storage unit and/or device (e.g., a file system, database, collection of tables, RAM, and/or any other storage mechanism or medium) for storing data. Further, the data repository may include multiple different storage units and/or devices. The multiple different storage units and/or devices may or may not be of the same type or located at the same physical location.

In one or more embodiments, any non-volatile storage (not shown) and/or memory (not shown) of a computing device or system of computing devices may be considered, in whole or in part, as non-transitory computer readable mediums, which may store software and/or firmware.

Such software and/or firmware may include instructions which, when executed by the one or more processors (not shown) or other hardware (e.g. circuitry) of a computing device and/or system of computing devices, cause the one or more processors and/or other hardware components to perform operations in accordance with one or more embodiments described herein.

The software instructions may be in the form of computer readable program code to perform, when executed, methods of embodiments as described herein, and may, as an example, be stored, in whole or in part, temporarily or permanently, on a non-transitory computer readable medium such as a compact disc (CD), digital versatile disc (DVD), storage device, diskette, tape storage, flash storage, physical memory, or any other non-transitory computer readable medium.

In one or more embodiments, a virtualization host (102, 110) includes a hypervisor (not shown), which may also be referred to as a virtual machine monitor. In one or more embodiments, a hypervisor is any hardware (e.g., circuitry), software, firmware, or any combination thereof that includes functionality to manage the underlying hardware resources of a virtualization host (102, 110), and to make the hardware resources available for use by VMs, which execute on the hypervisor. Thus, the hypervisor abstracts the underlying hardware from the VMs.

In one or more embodiments, the hypervisor receives instructions from VMs and performs the instructions using the appropriate underlying hardware (e.g., processor(s), storage, networking components, etc.) Such instructions from a VM may be altered by the hypervisor into a form appropriate for the underlying hardware. For example, the operating system of a VM may seek to execute instructions for a particular processor type, and the hypervisor may translate the instructions to a form that the actual underlying hardware processors can process. Additionally or alternatively, certain instructions from a VM may be passed through a hypervisor for execution using the underlying hardware without modification. A hypervisor may function as a hardware scheduler that schedules when instructions from various VMs will be executed on underlying hardware, and what portion of the hardware resources of a computing device (e.g., storage, networking, processors, etc.) are made available to the VM. For example, many VMs, each with virtual processors allocated, may require that the hypervisor schedule when the underlying hardware processors will be used to execute instructions for the VMs. Hypervisors may perform any other functions (e.g., provide virtual network components, virtual storage components, etc.) without departing from the scope of embodiments described herein.

In one or more embodiments, virtualization hosts (102, 110) in a virtualization environment (100) may have any number of components for which data items (e.g., health readings) exist and may be obtained. Such health data items may include, but are not limited to: hypervisor health (e.g., based on errors in hypervisor error logs, hypervisor version, etc.); performance logs for the virtualization host or any portion thereof; storage capacity; system model; operating system version information; a set of data collections and/or types to be backed up; whether or not data is encrypted; whether or not data is to be encrypted when stored by a storage device; backup media type (disk, tape, etc.); whether or not garbage collection services are running; number of concurrent backups and restores being performed; storage characteristics (e.g., information about type of media used for backup, age of media, various attributes of the media, etc.); system model information (e.g., cluster information, generation of system, machine check exception history); information regarding updates and fixes made to a hypervisor after deployment; thermal data (e.g., processor temperature; memory temperature; storage disk temperature, network component temperature; other component temperature; voltage data; current data; power consumption data; ambient temperature data; chassis temperature; inlet temperatures; exhaust temperatures; minimum and maximum temperatures for any component; optical component temperatures; storage controller temperatures; network controller temperatures; alternating current (AC) input information; direct current (DC) input information; fan speed information; fan power consumption information; temperature and power information for various sub-systems; airflow information; etc.). Other types of data items may be used without departing from the scope of embodiments described herein. In one or more embodiments, the health of a given virtualization host contributes to the relative health of vProxies executing on the virtualization host.

In one or more embodiments, a VM (e.g., 104, 106, 112, 114) is an emulation of a computing device (described above), or any portion thereof, that is abstracted from the underlying hardware of a virtualization host (102, 110) that hosts the VM. In one or more embodiments, a VM may include functionality to perform any of the functionality of a physical computing device. For example, a VM may include an operating system in which any number of software applications exist and execute. As used herein, a VM may refer to any software execution environment that shares computing resources with other software execution environments, and includes, but is not limited to, virtual machines, emulators, containers, serverless computing environments, sandboxes, etc. A VM may have and/or include any amount of data. In one or more embodiments, the aggregate amount of data of a given VM is the total amount of data that is backed up to perform a successful backup of a VM, and which subsequently is restored to perform a successful restore of the VM.

In one or more embodiments, one type of VM that may execute on a virtualization host is a vProxy (108, 116). In one or more embodiments, a vProxy (108, 116) may be used to offload at least a portion of the workload of data transmission to and/or from backup storage devices (e.g., a data domain) to the vProxy (108, 116). A vProxy (108, 116) may be a relatively small VM in which an operating system executes and manages software configured to perform backup and/or restore operations, which may include causing data related to VMs to be copied to a data domain (e.g., a VM backup) or to be restored from a data domain (e.g., a VM restore). In one or more embodiments, a vProxy (108, 116) is packaged as a virtual appliance (e.g., in an .ovf format).

In one or more embodiments, a backup and restore management device (122) (discussed below) causes a vProxy (108, 116) to be added as a VM to any number of virtualization hosts (102, 110) (e.g., via interaction with a virtualization environment manager (118)). In one or more embodiments, each vProxy (108, 116) may have any number of vProxy health data items that can be obtained relating to the vProxy (108, 116). Such vProxy health data items may include, but are not limited to, supported transport modes (e.g., hotadd, NBD), number of concurrent backup and/or restores being performed, underlying health of the virtualization host (discussed above) on which the vProxy (108, 116) executes, etc. Additionally, a throughput value may be calculated for each vProxy. In one or more embodiments, a throughput value is the amount of data transferred over a defined period of time. Data may be transferred via backup and/or restore operations. Throughput may be measured for any amount of time and/or any number of backup and/or restore operations, and an average throughput per unit time may be calculated using such information. As an example, if a set of ten VMs are being backed up according to a configured backup policy, each VM has five TBs of data (for an aggregate total of 50 TB of data for the 10 VMs), and the backup takes 25 hours, then a vProxy performing the backup may have a throughput of two TB/hr. In one or more embodiments, a vProxy performs backup and restore operations using any number of concurrent sessions. For example, a vProxy may be configured to have up to twenty-five concurrent sessions, which may allow, for example, up to twenty-five concurrent backup and/or restore operations (e.g., backup of 25 separate one disk VMs, backup of one 25 disk VM, etc.) to be performed by the vProxy. One of ordinary skill in the art will appreciate that a vProxy may have any number of sessions configured, and that the quantity may depend, at least in part, on the configuration of and/or resources allocated to the vProxy (e.g., processors, storage, networking, etc.).

Although FIG. 1 shows each virtualization host (102, 110) having a vProxy (108, 116), vProxies may be distributed among the virtualization hosts in any manner. For example, only a portion of the virtualization hosts of a virtualization environment may have a vProxy, some virtualization hosts may have more than one vProxy, etc. In one or more embodiments, any vProxy (108, 116) may include functionality to perform backup and restore operations for any VM in a virtualization environment (100), (i.e., not just for the VMs on the virtualization host on which the vProxy resides).

In one or more embodiments, a virtualization environment (100) also includes a virtualization environment manager (118). In one or more embodiments, a virtualization environment manager (118) is also a computing device (described above). In one or more embodiments, a virtualization environment manager (118) provides a user interface for one or more entities for managing a virtualization environment (100). As such, the virtualization environment manager (118) is operatively connected to the virtualization hosts (102, 110) of the virtualization environment (100), and therefore has access to information related to the virtualization hosts (102, 110) and to the VMs (104, 106, 112, 114) executing on the virtualization hosts (102, 110), as well as any other computing devices (e.g., storage devices, network devices, etc.) that may exist within the virtualization environment (100). In one or more embodiments, a virtualization environment manager (118) allows entities to view information about the computing devices and VMs of a virtualization environment, to modify aspects of the configuration of such devices and VMs, to deploy or remove VMs (104, 106, 112, 114) on the virtualization hosts (102, 110), to configure networking and storage for the VMs, or to perform any other task(s) relevant to managing a virtualization environment (100).

In one or more embodiments, the system also includes a backup and restore management device (122). In one or more embodiments, the backup and restore management device (122) is a computing device (described above). The backup and restore management device (122) may be included in the same virtualization environment (100) as the virtualization hosts (102, 110) and virtualization environment manager (118). Alternatively, as shown in FIG. 1, the backup and restore management device (122) may be located outside of and operatively connected to the virtualization environment (100). In one or more embodiments, the backup and restore management device (122) includes functionality to manage backup and restore operations for VMs (e.g., 104, 106, 112, 114) of the virtualization environment (100). Such operations may be initiated and/or configured by an entity that administrates the virtualization environment (100), and may or may not be performed pursuant to a planned schedule (e.g., based on a configured backup and/or restore policy). In one or more embodiments, the backup and restore management device (122) is operatively connected to the virtualization hosts (102, 110) (e.g., via a virtualization environment manager (118)), and offloads certain aspects of backup and restore of VMs to vProxies (108, 116) (discussed above) residing on one or more virtualization hosts (102, 110).

In one or more embodiments, the backup and restore management device (122) includes a registered virtualization environment manager database (124). In one or more embodiments, a registered virtualization environment manager database (124) is a data repository. In one or more embodiments, a data repository is any type of storage unit and/or device (e.g., a file system, database, collection of tables, RAM, and/or any other storage mechanism or medium) for storing data. Further, the data repository may include multiple different storage units and/or devices. The multiple different storage units and/or devices may or may not be of the same type or located at the same physical location. In one or more embodiments, the registered virtualization environment manager database (124) includes information related to the various registered virtualization environment managers (e.g., 118) that have been registered with the backup and restore management device (122), thereby allowing the backup and restore management device (122) to perform backup and/or restore operations for VMs (104, 106, 112, 114) of virtualization hosts (102, 110) managed by the virtualization environment manager (118) of a virtualization environment (100). The information regarding registered virtualization environment managers (e.g., 118) may include, but is not limited to, identifying information, access information, location information, etc.

In one or more embodiments, the backup and restore management device (122) includes a VM database (126). In one or more embodiments, a VM database (126) is a data repository (described above). In one or more embodiments, the VM database (126) stores information related to VMs managed by the registered virtualization environment managers for which information is stored in the registered virtualization environment manager database (124). Information related to VMs that may be stored in the VM database includes, but is not limited to, identifying information, access information, configuration information (e.g., operating system, applications, storage, networking, etc.), number of VMs that are part of a given configured backup policy, number of disks each VM has, applications executing on the VM, whether the VM is considered a critical VM, the size of the disks of a VM, etc. In one or more embodiments, such information may be used to assign, where appropriate, special requirements that the VM may have when being backed up. Such requirements may include, for example, that a VM has a high number of disks, and thus requires one or more vProxies performing to have a number of sessions configured that is equal to or greater than the number of disks. As another example, a VM may be executing a critical application, and thus require that a vProxy performing a backup of the VM be used exclusively for that VM during the backup operation. Other special requirements may be assigned without departing from the scope of embodiments described herein.

In one or more embodiments, the backup and restore management device (122) also includes a vProxy load balancer (130). In one or more embodiments, a vProxy load balancer (130) is any hardware (e.g., circuitry), software, firmware, or any combination thereof that includes functionality to balance the backup and restore load between vProxies (discussed above) within a virtualization environment (100). For example, a vProxy load balancer (130) may attempt to cause a relatively similar number of concurrent backup and restore sessions of VMs being performed by a set of vProxies within a virtualization environment. As an example, a vProxy load balancer (130) may be one or more processes executing on one or more processors (including circuitry therein) of the backup and restore management device (122) to load balance between vProxies.

In one or more embodiments, the backup and restore management device (122) also includes a backup operation analyzer (128). In one or more embodiments, a backup operation analyzer (128) is any hardware (e.g., circuitry), software, firmware, or any combination thereof that includes functionality to use assessments of the health of vProxies and characteristics of VMs to be backed up to map preferred vProxies to VMs to perform backup operations. In one or more embodiments, a backup operation analyzer (128) also includes functionality to assess, at the time a backup operation is to be performed for a given VM, whether the preferred vProxy is available to perform the backup operation. In one or more embodiments, if the preferred vProxy is not available to perform the backup operation, then the backup operation analyzer (128) may select a similar vProxy to perform the backup operation or, if no similar vProxy is available, an alternate vProxy (e.g., whatever optimal vProxy is ranked the highest on a list of optimal, healthy vProxies). As an example, a backup operation analyzer (128) may be one or more processes executing on one or more processors (including circuitry therein) of the backup and restore management device (122) to obtain and store vProxy health data items, characteristics, and throughput data, and perform various types of analysis based on such data items to assign the vProxies to certain VMs as preferred vProxies for performing backup operations for the VMs. The backup operation analyzer (128), and components included in and/or operatively connected to the backup operation analyzer (128), are discussed further in the description of FIG. 1B, below.

In one or more embodiments, the system also includes a data domain (120). In one or more embodiments, the data domain (120) is a computing device (discussed above) or set of computing devices that include data storage, and includes functionality to store VM information that is used as a backup of a given VM and/or to restore a given VM to a virtualization host (102, 110) of a virtualization environment (100) using data relating to the VM stored in the data storage of the data domain (120). In one or more embodiments, a backup and restore management device (122) uses one or more vProxies (108, 116) to transport data to and/or from the data domain (120) during backup and restore operations.

In one or more embodiments, the virtualization hosts (102, 110), the data domain (120), and the backup and restore management device (122) are operatively connected via a network (not shown). A network may refer to an entire network or any portion thereof (e.g., a logical portion of the devices within a topology of devices). A network may include a data center network, a wide area network, a local area network, a wireless network, a cellular phone network, or any other suitable network that facilitates the exchange of information from one part of the network to another. A network may be located at a single physical location, or be distributed at any number of physical sites. In one or more embodiments, a network may be coupled with or overlap, at least in part, with the Internet.

While FIG. 1A shows a configuration of components, other configurations may be used without departing from the scope of embodiments described herein. For example, there may be any number of virtualization hosts within a virtualization environment. As another example, there may be any number of VMs on a virtualization host. As another example, there may be any number of virtualization environments, each with any number of virtualization environment managers. As another example, a backup and restore management device may be operatively connected to any number of virtualization environment managers within any number of virtualization environments. As another example, the system may include any number of data domains. As another example, there may be any number of vProxies in a given virtualization environment, which may be distributed in any manner among the virtualization hosts of the virtualization environment. Accordingly, embodiments disclosed herein should not be limited to the configuration of components shown in FIG. 1A.

Figure 1B:
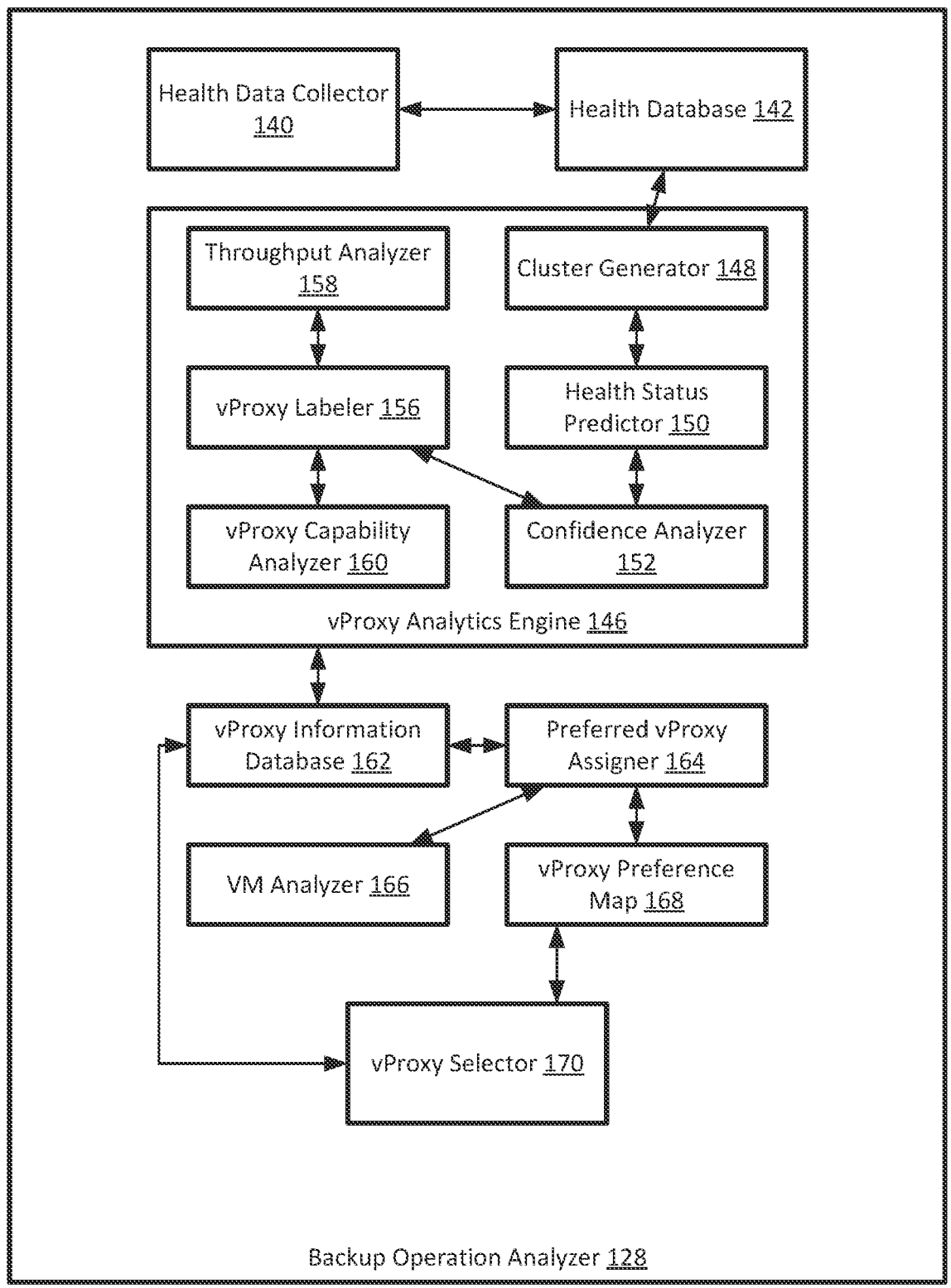
FIG. 1B shows a diagram of a vProxy analyzer in accordance with one or more embodiments of the invention.

FIG. 1B shows a diagram of a backup operation analyzer (128) in accordance with one or more embodiments described herein. The backup operation analyzer (128) may include a health data collector (140), a health database (142), and a vProxy analytics engine (146). The vProxy analytics engine (146) may include a cluster generator (148), a health status predictor (150), a confidence analyzer (152), a throughput analyzer (158), a vProxy labeler (156), and a vProxy capability analyzer (160). The backup operation analyzer (128) may also include a vProxy information database (162), a preferred vProxy assigner (164), a VM analyzer (166), a vProxy preference map (168), and a vProxy selector (170). Each of these components is described below.

In one or more embodiments, the backup operation analyzer (128), as discussed above in the description of FIG. 1A, is a computing device, or portion thereof, which may be located within or be external to a virtualization environment (100) that includes vProxies (108, 116) for which the backup operation analyzer (128) is analyzing vProxies and VMs to assign preferred vProxies to VMs for backup operations.

In one or more embodiments, a health data collector (140) is any hardware (e.g., circuitry), software, firmware, or any combination thereof that includes functionality to obtain health data items (discussed above in the description of FIG.

1) of vProxies in a virtualization environment. In one or more embodiments, the health data collector (140) obtains the health data items via a network interface (not shown) of the backup operation analyzer (128). As an example, a health data collector (140) may be one or more processes executing on one or more processors (including circuitry therein) of the backup operation analyzer (128) to obtain and store health data items.

In one or more embodiments, the backup operation analyzer (128) also includes a health database (142) operatively connected to the health data collector (140). In one or more embodiments, a health database (142) is a data repository. In one or more embodiments, a data repository is any type of storage unit and/or device (e.g., a file system, database, collection of tables, RAM, and/or any other storage mechanism or medium) for storing data. Further, the data repository may include multiple different storage units and/or devices. The multiple different storage units and/or devices may or may not be of the same type or located at the same physical location.

In one or more embodiments, a health database (142) is a database that records entries as a series of sets of data items associated with a health data item of a given vProxy at a given time. For example, for each vProxy in the virtualization environment, the health database (142) may include a set of types of health data items obtained related to the vProxy. Such per device health data item information may be organized in any manner, such as in separate tables, aggregated into a single table, etc., and may be organized as a time-series database that records health data items over time.

In one or more embodiments, the backup operation analyzer (128) includes a vProxy analytics engine (146). In one or more embodiments, a vProxy analytics engine (146) is any hardware (e.g., circuitry), software, firmware, or any combination thereof that includes functionality to analyze health data items (discussed above in the description of FIG. 1) and throughput data associated with vProxies in a virtualization environment. For example, a vProxy analytics engine (146) may be one or more processes executing on one or more processors of the backup operation analyzer (128). In one or more embodiments, the vProxy analytics engine (146) includes functionality to assess health conditions for vProxies based on the aforementioned health data items to make a prediction of future health conditions, assign a confidence to the predictions, and rank the predictions based on a confidence analysis. In one or more embodiments, the vProxy analytics engine also includes functionality to calculate the throughput performance of each vProxy.

In one or more embodiments, the vProxy analytics engine (146) includes a cluster generator (148). In one or more embodiments, the cluster generator (148) is operatively connected to the health database (142). In one or more embodiments, the cluster generator is any hardware (e.g., circuitry), software, firmware, or any combination thereof that includes functionality to use the health data items to group vProxies into two clusters of vProxies.

In one or more embodiments, the cluster generator (148) includes functionality to generate clusters using the health data items for vProxies. In one or more embodiments, the cluster generator (148) is configured to organize the data to create two clusters (e.g., C1 and C2). In one or more embodiments, the cluster generator (148) uses a clustering algorithm such as a Hierarchical Density-Based Spatial Clustering of Applications with Noise (HDBSCAN). In one or more embodiments, HDBSCAN uses the data to assess the density relationships present in the data, using techniques such as, for example, a nearest neighbor analysis, defining a mutual reachability distance, building minimum spanning trees using an appropriate algorithm, building a hierarchy of cluster with minimum cluster sizes, and then assigning a cluster label to the computing devices for which predicted health data items were used as the data set by the cluster generator (148). One of ordinary skill in the art will appreciate that any other clustering analysis algorithm may be used without departing from the scope of embodiments described herein.

In one or more embodiments, the vProxy analytics engine (146) also includes a health status predictor (150). In one or more embodiments, a health status predictor (150) is any hardware (e.g., circuitry), software, firmware, or any combination thereof that includes functionality to use the aforementioned cluster labels created from the data items obtained by the health data collector (140) and stored in the health database (142) to predict health statuses (e.g., health is HIGH or LOW relative to a threshold) for vProxies in the virtualization environment. In one or more embodiments, the health status predictor (150) may use any scheme for determining if a given cluster generated by a cluster generator should be labeled as high health or low health. For example, a health status predictor (150) may use any machine learning algorithm to make the prediction. Such a prediction may be made, for example, by comparing the predicted health associated with a given vProxy, along with the cluster label assigned to predict the future health status for the vProxy, to a known data set of healthy and unhealthy vProxies and the health information items that lead to the healthy or unhealthy status. In one or more embodiments, one or more thresholds are defined that are used to determine whether a status label assigned to a vProxy and/or virtualization host should be HIGH (i.e., high health) or LOW (i.e., low health).

In one or more embodiments, the vProxy analytics engine (146) also includes a confidence analyzer (152). In one or more embodiments, a confidence analyzer (152) is any hardware (e.g., circuitry), software, firmware, or any combination thereof that includes functionality to use the aforementioned data items obtained by health data collector (140) and stored in the health database (142), along with the labels assigned by the health status predictor (150), to assign a confidence value to the prediction of health status. In one or more embodiments, the confidence analyzer (152) uses a transductive confidence machine to assign a confidence to each prediction. Such confidence may be assigned, for example, by calculating a non-conformity score relative to possible status predictions, using the non-conformity scores to determine uncertainty values (e.g., p-values), and using the uncertainty values to determine credibility and, ultimately, confidence values for each prediction.

In one or more embodiments, the vProxy analytics engine (146) also includes a throughput analyzer (158). In one or more embodiments, a throughput analyzer (158) is any hardware (e.g., circuitry), software, firmware, or any combination thereof that includes functionality to obtain throughput data for vProxies in a virtualization environment, and use the throughput data to calculate a throughput per unit time throughput value for each vProxy. As an example, for a given vProxy, the throughput analyzer (158) may obtain the amount of data transferred by the vProxy during each of the last five backup jobs performed by the vProxy, and the amount of time it took the vProxy to complete the data transfer for each backup job. Such data may then be used by the throughput analyzer (158) to determine the amount of data per unit time (e.g., per hour) that was transferred by the vProxy for each backup job. Each throughput value may then be added together and divided by five to determine the average throughput value for the vProxy for the last five backup jobs performed by the vProxy.

In one or more embodiments, the vProxy analytics engine (146) also includes a vProxy labeler (156). In one or more embodiments, a vProxy labeler (156) is any hardware (e.g., circuitry), software, firmware, or any combination thereof that includes functionality to assign a label of optimal or non-optimal to a given vProxy based at least in part on the predicted health status of the vProxy, the confidence value assigned to the predicted health status label, and/or the throughput value calculated for the vProxy. In one or more embodiments, the vProxy labeler (156) includes functionality to filter a list of vProxies that are assigned a high health label to include only those vProxies for which a confidence score of the health label was above a confidence threshold (e.g., 75%).

In one or more embodiments, the vProxy labeler (156) may include functionality to assess, for each vProxy in the filtered list of vProxies labeled high health with a confidence level above the confidence threshold, the throughput value for the vProxy to determine if the throughput is above or below a throughput threshold. In one or more embodiments, the throughput threshold is configured and/or configurable by an entity managing a virtualization environment. Additionally or alternatively, the throughput threshold maybe automatically set. In one or more embodiments, if a vProxy with a high health label and a confidence score over the confidence score threshold also has a throughput value over the throughput threshold, then the vProxy labeler (156) assigns the vProxy a label of optimal as a result of the assessment of the vProxy at the time the assessment is made. If, on the other hand, the throughput was below the throughput threshold, then the vProxy labeler (156) assigns a label of non-optimal.

In one or more embodiments, each assessment of optimal or non-optimal for each vProxy so assessed is stored, along with a time stamp, in a time-series database. In one or more embodiments, the vProxy labeler (156) includes functionality to assess the optimal and/or non-optimal labels assigned to a given vProxy at the times at which such assessments were made to determine a suggested action for the vProxy. The number of assessments used for such a determination may be set automatically, and/or may be configurable by an entity managing backup and restore operations for VMs in a virtualization environment. In one or more embodiments, the suggested action may be a delete suggestion if the vProxy has been labeled as non-optimal for a number of consecutive assessments. In one or more embodiments, the suggested action may be a keep suggestion of the vProxy has been labeled optimal for a number of consecutive assessments. In one or more embodiments, the suggested action may be to monitor the vProxy (e.g., a warning) if the vProxy has been assessed as both optimal and non-optimal within the number of assessments that is automatically set or configured.

In one or more embodiments, the vProxy analytics engine (146) also includes a vProxy capability analyzer (160). In one or more embodiments, a vProxy capability analyzer (160) is any hardware (e.g., circuitry), software, firmware, or any combination thereof that includes functionality to use vProxy health, vProxy label, vProxy throughput, and/or any other characteristics of a vProxy to determine what one or more capabilities for performing backup operations that a given vProxy has. Such capabilities may include, but are not limited to, performing high concurrency backups, performing backups of VMs with large data sets, performing backups of critical VMs (e.g., VMs executing critical applications), etc.

In one or more embodiments, the backup operation analyzer (128) also includes a vProxy information database (162) operatively connected to the vProxy analytics engine (146). In one or more embodiments, a vProxy information database (162) is a data repository. In one or more embodiments, a data repository is any type of storage unit and/or device (e.g., a file system, database, collection of tables, RAM, and/or any other storage mechanism or medium) for storing data. Further, the data repository may include multiple different storage units and/or devices. The multiple different storage units and/or devices may or may not be of the same type or located at the same physical location.

In one or more embodiments, a vProxy information database (162) is a database that stores information associated with vProxies that includes, but is not limited to, an identifier of the vProxy, one or more capabilities of the vProxy for performing backup operations, any VMs for which a vProxy has been assigned as a preferred vProxy, the current health status of the vProxy, etc.

In one or more embodiments, the backup operation analyzer (128) also includes a VM analyzer (166). In one or more embodiments, a VM analyzer (166) is any hardware (e.g., circuitry), software, firmware, or any combination thereof that includes functionality to assess various characteristics of VMs to determine if a given VM has any special backup operation requirements. For example, a VM with twenty separate virtual disks may require one or more vProxies to perform a backup operation that have an aggregate of at least twenty backup sessions available to perform the backup operation. As another example, a given VM may have several terabytes of associated data, and thus require a vProxy with a capability of backing up large data sets. As another example, a VM may be executing an application that is considered a critical application, and therefore may require an exclusive vProxy that only backs up that VM when backup operations are performed for the VM. Other backup operation requirements may be determined without departing from the scope of embodiments described herein.

In one or more embodiments, the backup operation analyzer (128) also includes a preferred vProxy assigner (164). In one or more embodiments, a preferred vProxy assigner (164) is any hardware (e.g., circuitry), software, firmware, or any combination thereof that includes functionality to correlate backup capabilities of vProxies with backup requirements of VMs to assign one or more preferred vProxies to each VM to be backed up. In one or more embodiments, the mappings of VM to preferred vProxy are stored in a vProxy preference map (168) of the backup operation analyzer (128). In one or more embodiments, the mappings are also store per vProxy in the vProxy information database (162)

In one or more embodiments, the backup operation analyzer (128) also includes a vProxy selector (170). In one or more embodiments, a vProxy selector (170) is any hardware (e.g., circuitry), software, firmware, or any combination thereof that includes functionality to, at the time a backup operation is to be performed for a given VM, select a vProxy to perform the backup operation. In one or more embodiments, if the preferred vProxy is available, the vProxy selector (170) selects the vProxy to perform the backup. In one or more embodiments, if the preferred vProxy is not available, the vProxy selector (170) may use the vProxy information database to find a vProxy with the same backup capability as the preferred vProxy, and select that vProxy to perform the backup operation. In one or more embodiments, if a similar vProxy is not available, then the vProxy selector (170) may select an alternate vProxy to perform the backup operation based on any other selection criteria (e.g., the vProxy is healthy and available).

While FIG. 1B shows a configuration of components, other configurations may be used without departing from the scope of embodiments described herein. Accordingly, embodiments disclosed herein should not be limited to the configuration of components shown in FIG. 1B.

Figure 2A:
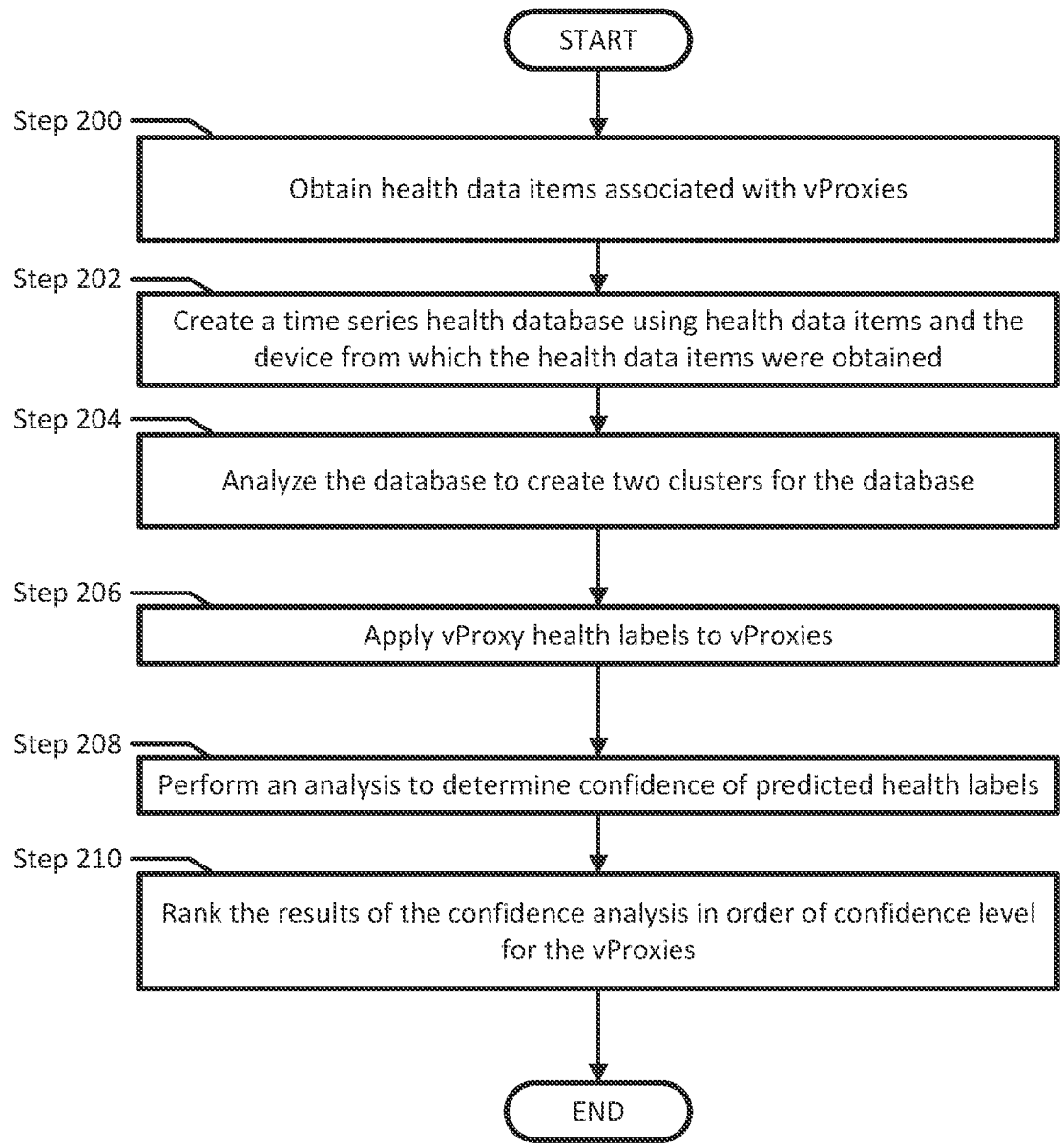
FIG. 2A shows a flowchart in accordance with one or more embodiments of the invention.

FIG. 2A shows a flowchart describing a method for management of vProxies in accordance with one or more embodiments disclosed herein.

While the various steps in the flowchart shown in FIG. 2A are presented and described sequentially, one of ordinary skill in the relevant art, having the benefit of this Detailed Description, will appreciate that some or all of the steps may be executed in different orders, that some or all of the steps may be combined or omitted, and/or that some or all of the steps may be executed in parallel.

Prior to Step 200, although not shown in FIG. 2A, one or more virtualization environments are registered with a backup and restore management device, which stores information related to the virtualization environment managers, the virtualization hosts being managed by the virtualization environment manager, and the VMs deployed on the virtualization hosts.

In Step 200, health data items associated with vProxies in a virtualization environment are obtained. In one or more embodiments, any number of sets of such data items may be obtained, each associated with a respective vProxy. As discussed above in the description of FIG. 1A, vProxy health data items may include may include, but are not limited to: supported transport modes (e.g., hotadd, NBD), number of concurrent backup and/or restores being performed, underlying health of the virtualization host on which the vProxy (108, 116) executes, etc. Also as discussed above in the description of FIG. 1A, virtualization host health data items may include, but are not limited to: hypervisor health (e.g., based on errors in hypervisor error logs, hypervisor version, etc.); performance logs for the virtualization host or any portion thereof; storage capacity; system model; operating system version information; a set of data collections and/or types to be backed up; whether or not data is encrypted; whether or not data is to be encrypted when stored by a storage device; backup media type (disk, tape, etc.); whether or not garbage collection services are running; number of concurrent backups and restores being performed; storage characteristics (e.g., information about type of media used for backup, age of media, various attributes of the media, etc.); system model information (e.g., cluster information, generation of system, machine check exception history); information regarding updates and fixes made to a hypervisor after deployment; thermal data (e.g., processor temperature; memory temperature; storage disk temperature, network component temperature; other component temperature; voltage data; current data; power consumption data; ambient temperature data; chassis temperature; inlet temperatures; exhaust temperatures; minimum and maximum temperatures for any component; optical component temperatures; storage controller temperatures; network controller temperatures; alternating current (AC) input information; direct current (DC) input information; fan speed information; fan power consumption information; temperature and power information for various sub-systems; airflow information; etc.). Other types of health data items for vProxies and/or virtualization hosts may be used without departing from the scope of embodiments described herein.

In one or more embodiments, in regards to virtualization host health data items, in some cases the overall health of the virtualization host on which a given vProxy executes is of interest. However, any subset of such health data items may be used instead. For example, scenarios may exist where the storage of a virtualization host is to be analyzed to determine health status. Accordingly, in the context of FIG. 2, virtualization host health data items may refer to any or all health data items of a virtualization host, or may apply to the portion of the virtualization host (e.g., storage, hypervisor, etc.) for which the analysis is to be performed.

In one or more embodiments, such data items are obtained by a health data collector of a backup operation analyzer. For example, health data items may arrive at a network interface of a backup operation analyzer, and a health data collector may obtain the data items via, at least in part, the network interface.

In Step 202, health data items stored in a time series health database. In one or more embodiments, series of health data items are timestamped when stored in the health database. As an example, health data items may be stored in the health database by the health data collector performing write operations to write the health data items to a storage medium, which are stored for each vProxy along with the timestamp of when the data was collected and/or generated.

In Step 204, the health data items are used to generate two clusters that are assigned as cluster labels to the vProxies of the virtualization environment. In one or more embodiments, HDBSCAN is used to generate and apply the cluster labels to the vProxies. In one or more embodiments, HDBSCAN uses the health data items to assess the density relationships present in the data, using techniques such as, for example, a nearest neighbor analysis, defining a mutual reachability distance, building minimum spanning trees using an appropriate algorithm, building a hierarchy of cluster with minimum cluster sizes, and then assigning a cluster label to the vProxies for which predicted health data items were used as the data set. One of ordinary skill in the art will appreciate that any other clustering analysis algorithm may be used without departing from the scope of embodiments described herein.

In one or more embodiments, the clusters are labeled high health and low health, thereby creating a binary classification. In one or more embodiments, though not shown in FIG. 2A, an exchangeability test is performed on the labels. In one or more embodiments, if the exchangeability test fails, the entity administrating the virtualization environment is informed, and the vProxy selection processes reverts to whatever scheme (e.g., random selection, round-robin selection, etc.) was implemented prior to embodiments described herein for selecting one or more vProxies for use for backup and/or restore operations/jobs. In one or more embodiments, if the exchangeability test passes, then the method proceeds to Step 206.

In Step 206, the health labels applied to the vProxy clusters in Step 204 are assigned to each specific vProxy. For example, an identifier of a vProxy may be associated with the label that was applied to the cluster within which the vProxy was categorized.

In Step 208, for the health statuses predicted for the vProxies and virtualization hosts, an analysis is performed to determine a confidence associated with the health status prediction. In one or more embodiments, any prediction confidence scheme may be used to determine the confidence level of a given prediction. One non-limiting example of such a scheme is a transductive confidence machine. In one or more embodiments, such a scheme assesses a future health status prediction against the information in the health database to determine that, for vProxies hosts having similar sets of data items, whether the predicted health status was correct for similar sets of health data items of other vProxies. In one or more embodiments, if a confidence value assigned to a given prediction of health status is below a confidence threshold, then the prediction may be discarded prior to continuing to Step 210.

In Step 210, the predicted health statuses are ranked based on the confidence levels assigned in Step 210 for the vProxies, and separately for the virtualization hosts (or portions thereof). For example, an assessment of ten vProxies that were predicted to have a high health yields a confidence level of each prediction. In one or more embodiments, the predicted health status having the highest confidence value is at the top of the ranking, with each subsequent entry in the ranking having a progressively lower confidence value.

Figure 2B:
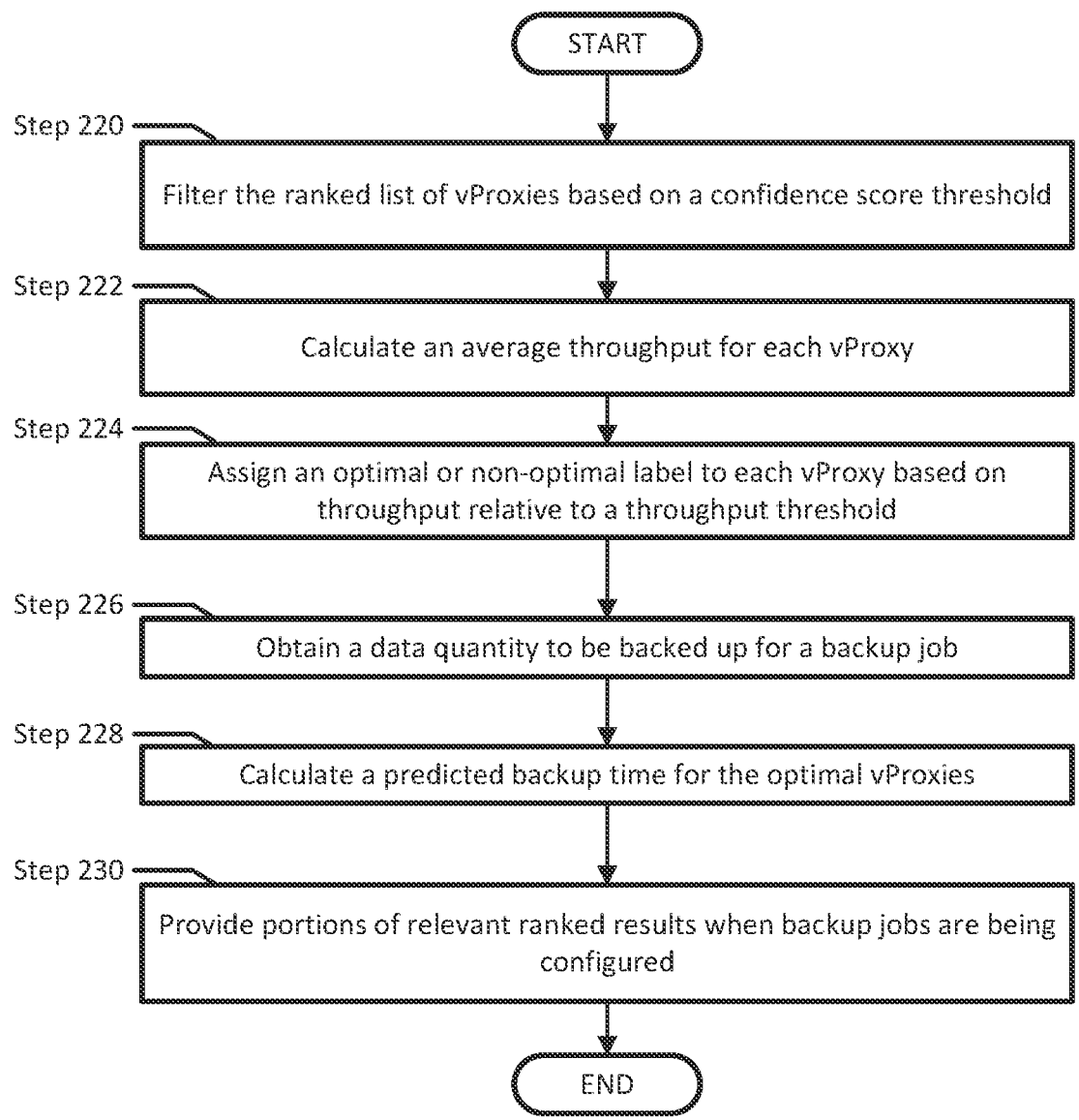
FIG. 2B shows a flowchart in accordance with one or more embodiments of the invention.

FIG. 2B shows a flowchart describing a method for management of vProxies in accordance with one or more embodiments disclosed herein.

While the various steps in the flowchart shown in FIG. 2B are presented and described sequentially, one of ordinary skill in the relevant art, having the benefit of this Detailed Description, will appreciate that some or all of the steps may be executed in different orders, that some or all of the steps may be combined or omitted, and/or that some or all of the steps may be executed in parallel.

In Step 220, the ranked list of vProxies generated via execution of the steps of FIG. 2A is filtered to remove vProxies that have a confidence score below a confidence score threshold. For example, a confidence score threshold of 75% may be set, and any vProxy having a confidence score below the threshold may be removed from the list of vProxies. Accordingly, after Step 220 is complete, in one or more embodiments, a list is obtained of healthy vProxies that have a confidence score relating to the healthy label that is above a confidence score threshold.

In Step 222, an average throughput is calculated for each vProxy remaining on the list of vProxies after Step 220. In one or more embodiments, the throughput is calculated by determining the amount of data transferred by a given vProxy in a defined amount of time. For example, a vProxy is configured with twenty sessions, and, as part of a backup job scheduled via creation of a backup profile, performed a backup of twenty VMs having an aggregate amount of data equal to twelve TB in eighteen hours. In such a scenario, the throughput per hour for the backup job is calculated to be two-thirds of a TB per hour. As another example, a vProxy is configured with twenty-five sessions, and, as part of a backup job scheduled via creation of a backup profile, performed a backup of fifteen VMs having an aggregate amount of data equal to fourteen TB in seven hours. In such a scenario, the throughput per hour for the backup job is calculated to be two TB/hr.

Although the previous two examples presume that a vProxy is only performing a single backup job for a number of VMs at one time, one of ordinary skill in the art will appreciate that any number of backup jobs may be performed for any number of VMs as part of scheduled backups pursuant to any number of configured backup policies. Additionally, although the two previous examples included backing up a number of VMs equal to or less than the number of concurrent sessions configured for a vProxy, a vProxy may backup more VMs than the number of configured sessions, with the additional VMs being queued for backup once a session becomes available. In one or more embodiments, in such a scenario, the queue depth depends on the number of VMs to be backed up, and the number of sessions configured for the vProxy. In one or more embodiments, a given throughput value calculated for a vProxy may be used to determine an average throughput for the vProxy, which becomes the throughput value for the vProxy. For example, the throughput per hour may be calculated for a vProxy for each backup job performed in the last week, and each of the calculated throughputs may be averaged to determine an average throughput value for the vProxy.

In Step 224, an optimal or non-optimal label is assigned to the vProxies based on the vProxies respective calculated throughput values relative to a throughput threshold. For example, a throughput threshold of one TB may be automatically set or configured by an entity managing a virtualization environment. In such a scenario, vProxies having a throughput at or above one TB/hr may be labeled optimal, while vProxies having an average throughput value below the threshold at the time of assessment may be assigned a non-optimal label. In one or more embodiments, the optimal and non-optimal labels for the vProxies are stored each time such an assessment is made.

In one or more embodiments, the labels are stored for each such assessment made for each vProxy. In one or more embodiments, the labels per vProxy are stored in a time series database. In one or more embodiments, the time series database of labels is used to generate a suggested action for each vProxy. In one or more embodiments, a suggested action may be based on any number of past assessments of optimal or non-optimal at a set of points in time. In one or more embodiments, the suggested action may be to keep a vProxy, delete a vProxy, or to monitor a vProxy. In one or more embodiments, a suggested action of keep indicates that a vProxy has been assigned a label of optimal for a defined consecutive number of assessments. In one or more embodiments, a suggested action of delete indicates that a vProxy has been assigned a label of non-optimal for a defined consecutive number of assessments. In one or more embodiments, a suggested action of monitor indicates that a vProxy has been assigned a label of optimal and of non-optimal during a defined consecutive number of assessments. In one or more embodiments, a suggested action for a given vProxy is also stored as part of the results of the vProxy assessment process.

In Step 226, a data quantity to be backed up for a given backup job is obtained. In one or more embodiments, the data quantity is for a manually configured backup of one or more VMs, and is the aggregate amount of data to be backed up. Additionally or alternatively, the data quantity may be for a set of one or more VMs for which a backup policy is configured, and is the aggregate amount of data to be backed up relating to the set of VMs.

In Step 228, a predicted backup time for a backup job is calculated. In one or more embodiments, the predicted backup time is calculated for all or any portion of the vProxies assigned an optimal label in Step 224. In one or more embodiments, the predicted backup time is calculated using the average throughput value for a vProxy and the data quantity obtained in Step 226. As a simple example, if a given vProxy has a throughput value of one TB/hr, and a backup job has an aggregate of ten TB of data to be backed up, then the predicted backup time is ten hours to complete the backup job. The predicted backup time may be calculated for all optimal vProxies that could be selected for a backup job or may be calculated once one or more vProxies are selected for a backup job. The predicted backup time may be for a single vProxy performing the backup, or for two or more vProxies performing the backup. In one or more embodiments, of a given vProxy is selected for a backup job, and one or more other vProxies have a predicted backup time that is shorter, that information may also be stored as part of the results of the vProxy analysis.

In Step 230, the results of the aforementioned analyses are provided to an entity tasked with managing a virtualization environment when such an entity requests a backup or restore operation. In one or more embodiments, the ranked vProxy list may be provided along with the ability for the entity to choose a vProxy for performing the backup or restore operation. In one or more embodiments, the results include a vProxy identifier of the vProxy, the predicted health status, the label of optimal or non-optimal, the suggested action, and/or the predicted backup time for one or more of the vProxies.

Figure 2C:
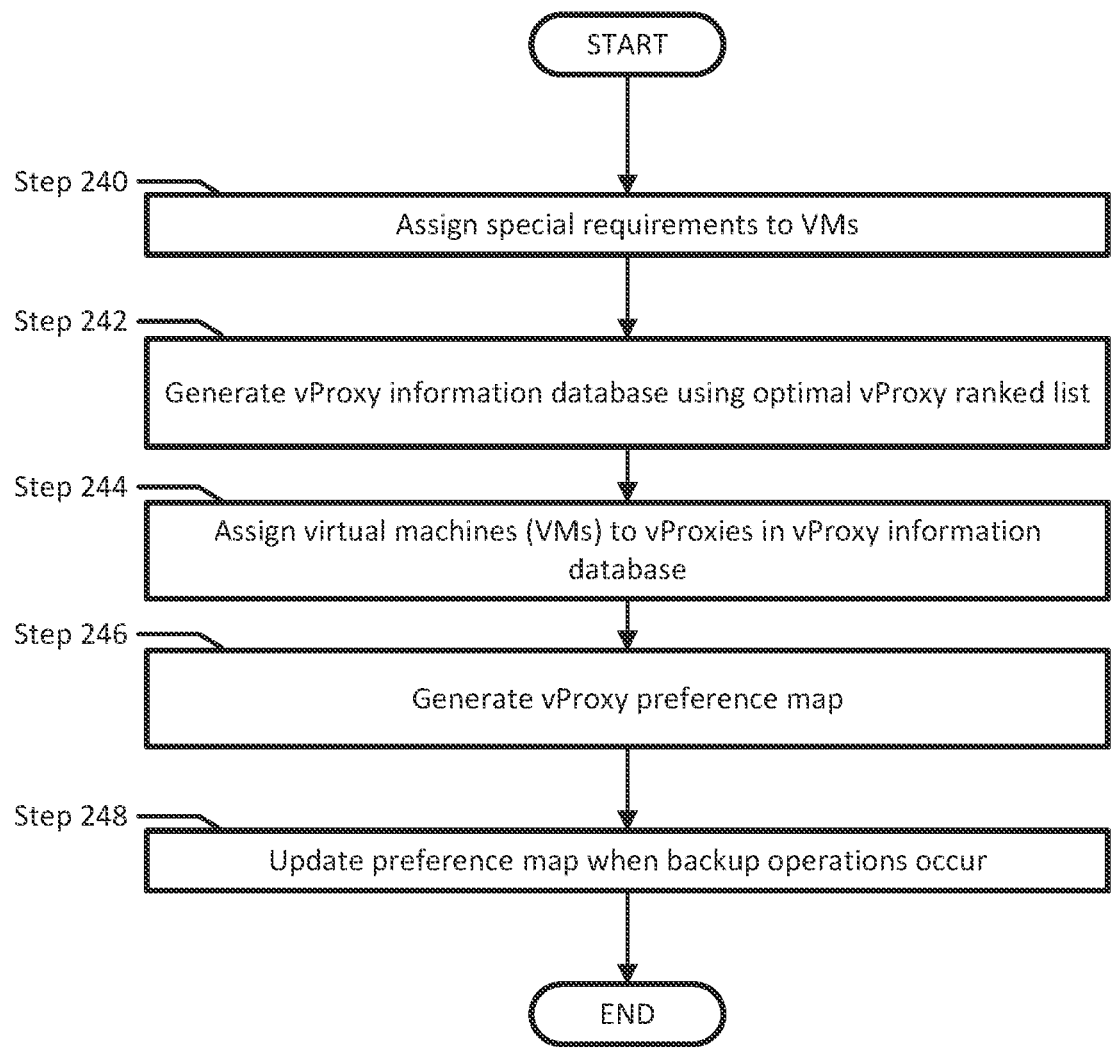
FIG. 2C shows a flowchart in accordance with one or more embodiments of the invention.

FIG. 2C show a flowchart describing a method for management of vProxies in accordance with one or more embodiments disclosed herein.

While the various steps in the flowchart shown in FIG. 2C are presented and described sequentially, one of ordinary skill in the relevant art, having the benefit of this Detailed Description, will appreciate that some or all of the steps may be executed in different orders, that some or all of the steps may be combined or omitted, and/or that some or all of the steps may be executed in parallel.

In Step 240, VMs are assessed to determine whether VMs to be backed up have any special requirements. Any information related to the VMs may be used to make such an assessment, such as any information stored in a VM database of a backup operation analyzer. As an example, a VM may be assessed and determined to have an associated amount of data to be backed up that is over a data quantity threshold (e.g., 2 TB), which lead to assigning the VM a special requirement of having a large data set. As another example, a given VM may have a number of disks over a threshold, which may lead to the assignment of the VM as having a special requirement of high concurrency (e.g., a vProxy backing up the VM must have a number of configured sessions high enough to be able to perform the backup of all disks concurrently).

In Step 242, a vProxy information database is generated using the ranked list of optimal vProxies created in FIGS. 2A and 2B. In one or more embodiments, each vProxy is then assessed to determine if it has any special capabilities for performing backups. For example, if a vProxy has a relatively large number of processors and amount of memory configured, it may be assigned as having the capability of backing up VMs with large data sets. As another example, if a vProxy has been optimal for a number of assessments in a row, it may be assigned as being appropriate to be exclusively assigned to perform backup operations for critical VMs. In one or more embodiments, the vProxy information database includes, but is not limited to, a vProxy identifier, one or more capabilities assigned to each vProxy (if any), any VMs mapped to the vProxy as a preferred vProxy, and the current health status of the vProxy (i.e., healthy or unhealthy).

In Step 244, VMs are assigned to vProxies, and the assignment is stored in the vProxy information database. In one or more embodiments, the assignment is based on matching the special requirements of a VM to the capabilities and/or status of one or more vProxies. As an example, a VM having twenty disks may be assigned to two separate vProxies each having 10 or more configured sessions so that the VM may have all disks backed up in parallel. As another example, a VM having over 1 TB of data may be assigned to a vProxy having the capability of backing up large data sets. As another example, a VM that has been labeled as critical by an entity managing a virtualization environment may be assigned to a VM that has been healthy and optimal for a number of consecutive assessments, and currently is not assigned any other VMs, thereby allowing the vProxy to perform a backup exclusively for the VM. As another example, VMs with no special requirements may be assigned to the highest vProxy on the ranked list of healthy, optimal vProxies.

In Step 246, a vProxy preference map is generated. In one or more embodiments, the vProxy preference map includes, but is not limited to, an identifier of each VM to be backed up, the one or more vProxies assigned as preferred vProxy(ies) for performing a backup operation for the VM, the last one or more vProxies that were used to perform a backup operation for the VM, any special requirements that were assigned to the VM, and a recommendation on whether or not a vProxy performing a backup for the VM may be shared for performing other backup operations. In one or more embodiments, if a vProxy should not be shared, the VM requires a vProxy that can perform an exclusive backup of only the VM. In one or more embodiments, a VM having a special requirement of a large data set, or being a critical VM, requires a vProxy to have the capability of performing an exclusive backup of the VM.

In Step 248, the vProxy preference map is updated as backup operations occur. For example, for each backup operation for a VM, the last one or more vProxies that performed the backup may be updated.

Figure 2D:
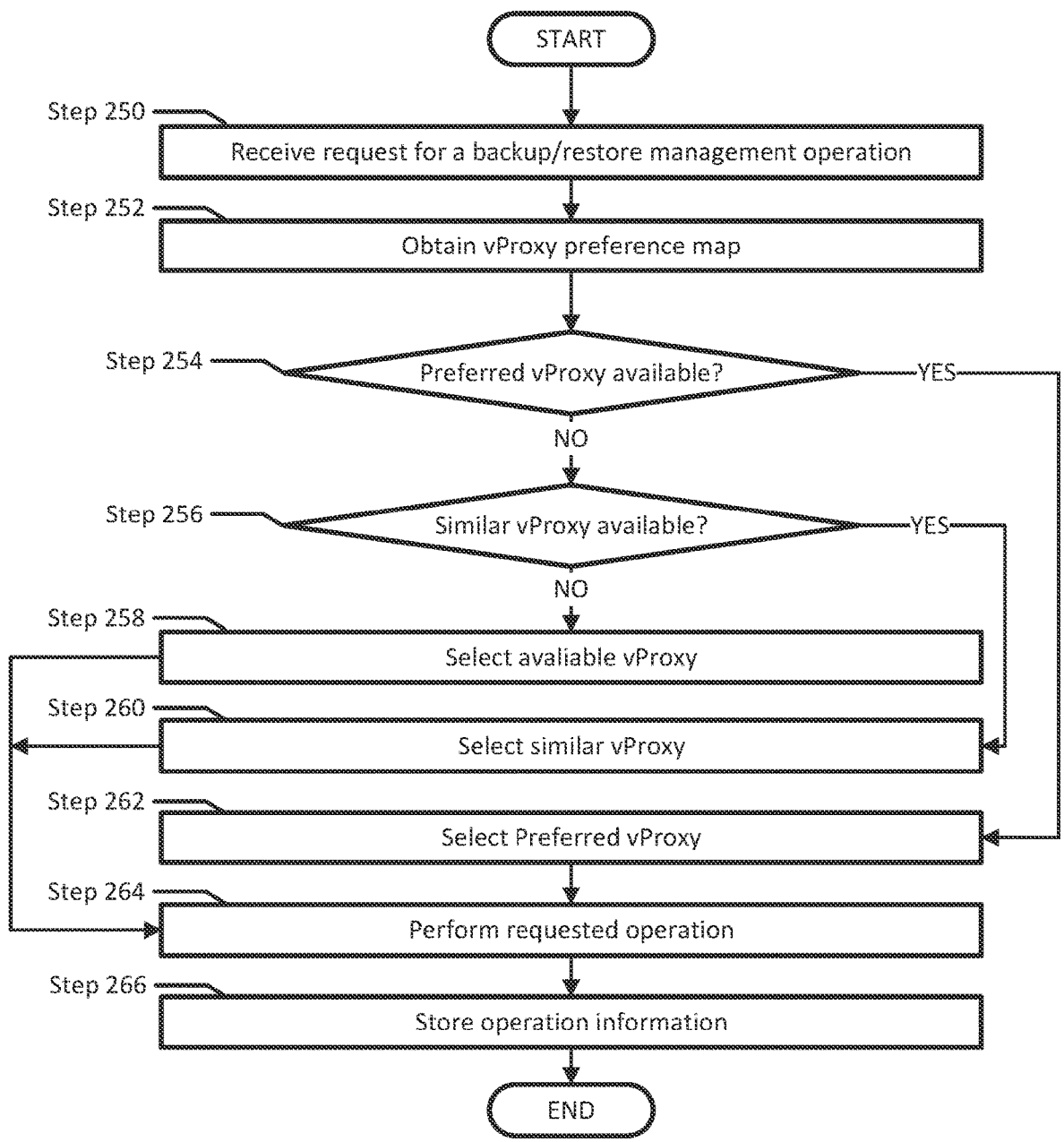
FIG. 2D shows a flowchart in accordance with one or more embodiments of the invention.

FIG. 2D shows a flowchart describing a method for management of vProxies in accordance with one or more embodiments disclosed herein.

While the various steps in the flowchart shown in FIG. 2D are presented and described sequentially, one of ordinary skill in the relevant art, having the benefit of this Detailed Description, will appreciate that some or all of the steps may be executed in different orders, that some or all of the steps may be combined or omitted, and/or that some or all of the steps may be executed in parallel.

In Step 250, a request is received to perform a backup operation for a VM. In one or more embodiments, the backup operation is requested as a backup of the single VM or more than one VM, and may or may not be pursuant to a backup schedule defined by a backup policy for a set of one or more VMs. In one or more embodiments, the request for a backup operation is received as part of a backup policy created for the backup of any number of VMs.

In Step 252, a vProxy preference map is obtained. In one or more embodiments, the vProxy preference map includes a mapping of VMs to preferred vProxies. A vProxy preference map may also include information regarding the last vProxy used to perform a backup operation for a VM, details about any special backup requirements that are associated with the VM, whether the vProxy to be used for backing up a VM can be shared or needs to be an exclusive vProxy, etc.

In Step 254, a determination is made as to whether a preferred vProxy is available to perform the backup operation. In one or more embodiments, the determination is made by checking the health and availability of the one or more vProxies listed as preferred in the vProxy preference map. In one or more embodiments, a preferred vProxy is not available, for example, if it is currently labeled unhealthy, or if it is already performing another backup operation and was assigned as an exclusive preferred VM. In one or more embodiments, if the preferred vProxy is available, the method proceeds to Step 262. In one or more embodiments, if the preferred vProxy is not available, the method proceeds to Step 256.

In Step 256, a determination is made as to whether a similar vProxy to the preferred vProxy is available to perform the backup operation. In one or more embodiments, a similar vProxy is a vProxy that has the same one or more backup capabilities as the preferred vProxy. In one or more embodiments, the capabilities of vProxies are obtained using a vProxy information database. In one or more embodiments, if a similar vProxy is available, the method proceeds to Step 260. In one or more embodiments, if the preferred vProxy is not available, the method proceeds to Step 258.

In Step 248, based on the determinations that preferred or similar vProxy is not available to perform the backup operation, an alternate vProxy is selected to perform the backup operation. In one or more embodiments, an alternate vProxy is any other vProxy that is available and healthy to perform the backup operation. For example, the alternate vProxy may be the healthy, optimal vProxy that was ranked highest on the ranked list generated by execution of the Steps in FIG. 2A and FIG. 2B.

In Step 260, based on a determination that a vProxy is available that is similar to the preferred vProxy, the similar vProxy is selected to perform the backup operation. For example, if a preferred vProxy was assigned based on having an assigned capability of performing backup operations for VMs with large data sets, a VM that is similarly assigned with the ability may be selected.

In Step 262, based on a determination that the preferred vProxy is available, the preferred vProxy is selected to perform the backup operation.

In Step 264, the backup operation is performed. In one or more embodiments, the backup operation is performed by whatever vProxy, preferred, similar to preferred, or alternate, was selected in one of Steps 258, 260, and 262. In one or more embodiments, performing a backup operation includes one or more vProxies copying any or all of the data associated with a VM to backup storage, such as a data domain.

In Step 266, information about the backup operation is stored, such as, for example, whether it was successful, how much data was backed up, how long the backup operation took to complete, throughput during the backup, the number of concurrent sessions were used during the backup, an aggregate time that a vProxy has been in existence and performing backup operations, whether the backup was successful, etc. Such information may be used, for example, in future assessments of the health of a vProxy, whether or not a vProxy qualifies as optimal, what one or more capabilities may be assigned to the vProxy, what VMs are assigned (or not) to the vProxy for future backups, etc.

FIGS. 3A-3B show an example in accordance with one or more embodiments described herein. The following example is for explanatory purposes only and not intended to limit the scope of embodiments described herein. Additionally, while the example shows certain aspects of embodiments described herein, all possible aspects of such embodiments may not be illustrated in this particular example. This example is intended to be a simple example to illustrates concepts described herein. One of ordinary skill will appreciate that a real-world use of embodiments described herein may include any number of vProxies, and that the information about the vProxies may exist in any combination, not just the various combinations described below.

Referring to FIG. 3A, consider a scenario in which a backup and restore management device is operatively connected to a virtualization environment. In particular, the backup and restore management device is operatively connected to a virtualization environment manager, which is registered with the backup and restore management device. Via the virtualization environment manager, the backup and restore management device populates appropriate databases with information related to virtualization hosts in the virtualization environment, and the VMs executing thereon.

In such an environment, a backup operation analyzer creates a vProxy preference map (300). The vProxy preference map (300) includes a list of VMs, the preferred one or more vProxies that are assigned to the VMs, the previous one or more vProxies used to back up the VMs, any special requirements related to the backup of the VMs, and a recommendation as to whether the vProxies used to back up the VM should be exclusive, or can be shared, and, if shared, if there are any limitations related to the sharing. VMs A-E are all part of a VM set configured to be backed up on a certain schedule in a backup policy.

In one or more embodiments, VM A is assigned vProxies 1 and 2 based on the requirement of a vProxy that can perform at least 20 concurrent backup sessions. In one or more embodiments, during a previous backup operation, VMs 7 and 8 were used to perform a backup operation for VM A. In one or more embodiments, whatever VMs are selected to perform a backup operation are recommended only if there are additional sessions available beyond the 20 VM A requires. VM B is assigned vProxy 3 as a preferred vProxy. The assignment is based on VM B not having any special requirements, and vProxy 3 being the highest ranked healthy and optimal vProxy at the time of assignment. VM B was backed up by vProxy 3 during the last backup operation. Whatever vProxy is to perform a backup operation for VM B may be shared for other backup operations. VM C is assigned vProxy 4 as a preferred vProxy based on VM C executing a critical application, and vProxy 4 being assigned the capability of performing backup operations for critical VMs. VM C was last backed up by vProxy 10. Whatever vProxy is to perform a backup operation for VM C must be exclusively assigned to VM C at the time of the backup. VM D is assigned vProxy 5 as a preferred vProxy. The assignment is based on VM B not having any special requirements, and VM 5 being the highest ranked healthy and optimal vProxy at the time of assignment. VM D was backed up by vProxy 11 during the last backup operation. Whatever vProxy is to perform a backup operation for VM D may be shared for other backup operations. VM E is assigned vProxy 6 as a preferred vProxy. The assignment is based on VM E having a special requirement of needing to back up a large data set, and vProxy 3 being the highest ranked healthy and optimal vProxy at the time of assignment that is assigned the capability of performing backup operations for large data sets. VM E was backed up by vProxy 15 during the last backup operation. Whatever vProxy is to perform a backup operation for VM E may not be shared during the backup session because it is required to have a high number of processors and amount of memory available to perform the backup operation.

FIG. 3B shows a vProxy information database (310). As shown in FIG. 3B, the vProxy information database (310) includes a list of vProxies, backup capabilities of the vProxies where applicable, any VMs that are mapped to the vProxies and for which the vProxies are preferred vProxies, and a current health status of the vProxies.

In one or more embodiments, when a backup operation is requested for a VM, the vProxy preference map is checked to determine the preferred vProxy for performing the backup operation. If the preferred vProxy is available, then it is used to perform the backup operation. If the preferred vProxy is not available, then the vProxy information database is checked to determine if there are any vProxies available with similar capabilities, and, if so, a similar vProxy is selected to perform the backup operation. If no similar vProxy is available, then any healthy VM is selected to perform the backup operation.

Based at least in part on the vProxy preference map (300) and the vProxy information database (310), the next time a backup happens for VMs A-E, the following vProxy selections are made: VM A will be backup using vProxies 1 and 2, as they are the preferred VMs and are healthy. VM B will be backed up by vProxy 3 because it is healthy and available. VM C will be backed up using vProxy 4 because it is healthy, assigned as the preferred vProxy for VM C, and has the capability of performing backup operations for critical VMs. VM D will be backed up by vProxy 5 because it is healthy and available. VM E will be backed up by vProxy 16, because the preferred vProxy 6 is unhealthy, and vProxy 16 has the assigned capability of performing backup operations for critical VMs.

Figure 4:
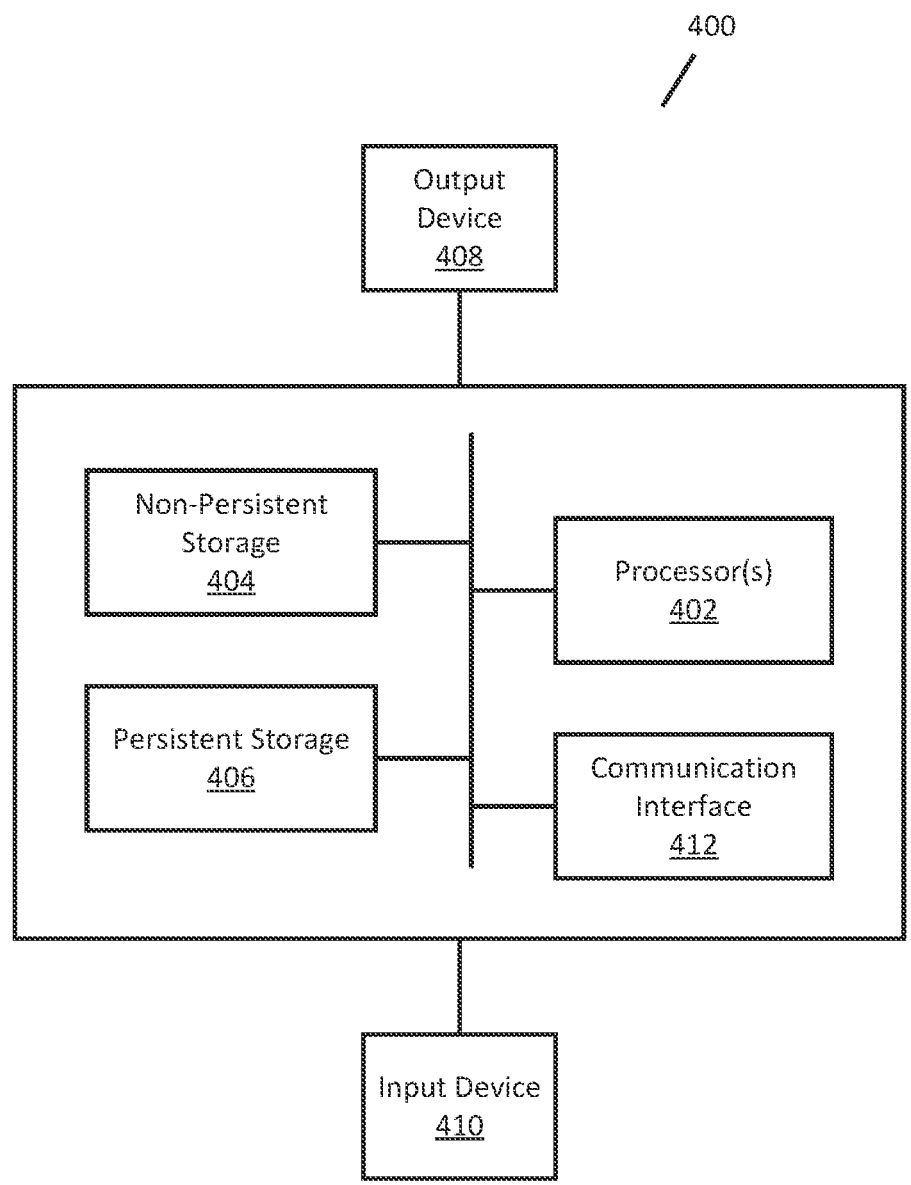
FIG. 4 shows a computing system in accordance with one or more embodiments of the invention.

As discussed above, embodiments of the invention may be implemented using computing devices. FIG. 4 shows a diagram of a computing device in accordance with one or more embodiments of the invention. The computing device (400) may include one or more computer processors (402), non-persistent storage (404) (e.g., volatile memory, such as random access memory (RAM), cache memory), persistent storage (406) (e.g., a hard disk, an optical drive such as a compact disc (CD) drive or digital versatile disc (DVD) drive, a flash memory, etc.), a communication interface (412) (e.g., Bluetooth® interface, infrared interface, network interface, optical interface, etc.), input devices (410), output devices (408), and numerous other elements (not shown) and functionalities. Each of these components is described below.

In one embodiment of the invention, the computer processor(s) (402) may be an integrated circuit for processing instructions. For example, the computer processor(s) may be one or more cores or micro-cores of a processor. The computing device (400) may also include one or more input devices (410), such as a touchscreen, keyboard, mouse, microphone, touchpad, electronic pen, or any other type of input device. Further, the communication interface (412) may include an integrated circuit for connecting the computing device (400) to a network (not shown) (e.g., a local area network (LAN), a wide area network (WAN) such as the Internet, mobile network, or any other type of network) and/or to another device, such as another computing device.

In one embodiment of the invention, the computing device (400) may include one or more output devices (408), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (402), non-persistent storage (404), and persistent storage (406). Many different types of computing devices exist, and the aforementioned input and output device(s) may take other forms.

Embodiments described herein address the problem of vProxy selection without accounting for the health and performance of the vProxies. In one or more embodiments, the aforementioned problem is addressed by performing analyses of the vProxies of a virtualization environment to determine the relative health of the vProxies and a corresponding confidence score of the health label, whether the healthy vProxies are optimal or non-optimal based on the average throughput value calculated for the vProxies, and/or the predicted backup time when using a given vProxy.

The problems discussed above should be understood as being examples of problems solved by embodiments of the invention and the invention should not be limited to solving the same/similar problems. The disclosed invention is broadly applicable to address a range of problems beyond those discussed herein.

While embodiments described herein have been described with respect to a limited number of embodiments, those skilled in the art, having the benefit of this Detailed Description, will appreciate that other embodiments can be devised which do not depart from the scope of embodiments as disclosed herein. Accordingly, the scope of embodiments described herein should be limited only by the attached claims.

What is claimed is:

1. A method for managing backup operations, the method comprising:
   receiving a request to perform a first backup operation for a first virtual machine (VM);
   making a first determination, using a vProxy preference map, that a first vProxy is assigned to the first VM based on a backup capability associated with the first vProxy,
      wherein the vProxy preference map specifies a set of entries, wherein an entry for the first VM specifies:
         the first vProxy and a second vProxy as preferred vProxies,
         a third vProxy and a fourth vProxy as previous vProxies,
         a special requirement of the first VM, wherein the special requirement is one selected from a group consisting of an indication that the first VM is associated with a large data set, an indication that in order to backup the first VM a vProxy must include a sufficient number of configured sessions to enable concurrent backup of the first VM, and the first VM is executing a critical application, and
         a recommendation, wherein the recommendation specifies whether or not a vProxy performing a backup for the first VM may be shared for performing other backup operations;
   making a second determination that the first vProxy is not available to perform the first backup operation based on the first vProxy being labeled unhealthy or the first vProxy performing another backup operation, and wherein labelling the first vProxy comprises:
      obtaining, by a health data collector, health data items associated with the first vProxy; and
      assigning, based on the health data items and using the health data collector, the first vProxy to a low health cluster;
   making a third determination, based on the second determination and using a vProxy information database and the vProxy Preference Map, that a second vProxy is available to perform the first backup operation based on the second vProxy being associated with the same backup capability as the first vProxy, and based on the health data collector assigning the second vProxy to a high health cluster; and performing the first backup operation using the second vProxy.

2. The method of claim 1, further comprising:

receiving a second request to perform a second backup operation for the first VM;

making a fourth determination, using the vProxy preference map, that the first vProxy is assigned to the first VM based on the backup capability associated with the first vProxy;

making a fifth determination that the first vProxy is available to perform the second backup operation; and performing, based on the fifth determination, the second backup operation using the first vProxy.

3. The method of claim 1, further comprising:

receiving a second request to perform a second backup operation for the first VM;

making a fourth determination, using the vProxy preference map, that the first vProxy is assigned to the first VM based on the backup capability associated with the first vProxy;

making a fifth determination that the first vProxy is not available to perform the second backup operation, wherein the availability of the first vProxy is determined by a vProxy analytics engine;

making a sixth determination, based on the fifth determination and using the vProxy information database, that no vProxy associated with the same backup capability as the first vProxy is available to perform the second backup operation;

assigning, based on the sixth determination, an alternate vProxy to perform the second backup operation; and performing the second backup operation using the alternate vProxy.

4. The method of claim 1, wherein the vProxy information database comprises a set of vProxies, each associated with at least one known backup capability.

5. The method of claim 1, wherein the backup capability is an ability to perform high concurrency backups.

6. The method of claim 1, wherein the backup capability is an ability to perform large dataset backups.

7. The method of claim 1, wherein the backup capability is an ability to perform critical VM backups.

8. A non-transitory computer readable medium comprising computer readable program code, which when executed by a computer processor enables the computer processor to perform a method for managing backup operations, the method comprising:

receiving a request to perform a first backup operation for a first virtual machine (VM);

making a first determination, using a vProxy preference map, that a first vProxy is assigned to the first VM based on a backup capability associated with the first vProxy, wherein the vProxy preference map specifies a set of entries, wherein an entry for the first VM specifies:

the first vProxy and a second vProxy as preferred vProxies, a third vProxy and a fourth vProxy as previous vProxies, a special requirement of the first VM, wherein the special requirement is one selected from a group consisting of an indication that the first VM is associated with a large data set, an indication that in order to backup the first VM a vProxy must include a sufficient number of configured sessions to enable concurrent backup of the first VM, and the first VM is executing a critical application, and a recommendation, wherein the recommendation specifies whether or not a vProxy performing a backup for the first VM may be shared for performing other backup operations;

making a second determination that the first vProxy is not available to perform the first backup operation based on the first vProxy being labeled unhealthy or the first vProxy performing another backup operation, and wherein labelling the first vProxy comprises:

obtaining, by a health data collector, health data items associated with the first vProxy; and assigning, based on the health data items and using the health data collector, the first vProxy to a low health cluster;

making a third determination, based on the second determination and using a vProxy information database and the vProxy Preference Map, that a second vProxy is available to perform the first backup operation based on the second vProxy being associated with the same backup capability as the first vProxy, and based on the health data collector assigning the second vProxy to a high health cluster; and performing the first backup operation using the second vProxy.

9. The non-transitory computer readable medium of claim 8, wherein the method performed by the execution of the computer readable program code further comprises:

receiving a second request to perform a second backup operation for the first VM;

making a fourth determination, using the vProxy preference map, that the first vProxy is assigned to the first VM based on the backup capability associated with the first vProxy;

making a fifth determination that the first vProxy is available to perform the second backup operation; and performing, based on the fifth determination, the second backup operation using the first vProxy.

10. The non-transitory computer readable medium of claim 8, wherein the method performed by the execution of the computer readable program code further comprises:

receiving a second request to perform a second backup operation for the first VM;

making a fourth determination, using the vProxy preference map, that the first vProxy is assigned to the first VM based on the backup capability associated with the first vProxy;

making a fifth determination that the first vProxy is not available to perform the second backup operation;

making a sixth determination, based on the fifth determination and using the vProxy information database, that no vProxy associated with the same backup capability as the first vProxy is available to perform the second backup operation;

assigning, based on the sixth determination, an alternate vProxy to perform the second backup operation; and performing the second backup operation using the alternate vProxy.

11. The non-transitory computer readable medium of claim 8, wherein the vProxy information database comprises a set of vProxies, each associated with at least one known backup capability.

12. The non-transitory computer readable medium of claim 8, wherein the backup capability is an ability to perform high concurrency backups.

13. The non-transitory computer readable medium of claim 8, wherein the backup capability is an ability to perform large dataset backups.

14. The non-transitory computer readable medium of claim 8, wherein the backup capability is an ability to perform critical VM backups.

15. A system for managing backup operations, the system comprising:
- a backup and restore management device comprising a processor, a memory device, a storage device, and a backup operation analyzer; and
- the backup operation analyzer, comprising circuitry, and configured to:
    - receive a request to perform a first backup operation for a first virtual machine (VM);
    - make a first determination, using a vProxy preference map, that a first vProxy is assigned to the first VM based on a backup capability associated with the first vProxy,
        - wherein the vProxy preference map specifies a set of entries, wherein an entry for the first VM specifies:
            - the first vProxy and a second vProxy as preferred vProxies,
            - a third vProxy and a fourth vProxy as previous vProxies,
            - a special requirement of the first VM, wherein the special requirement is one selected from a group consisting of an indication that the first VM is associated with a large data set, an indication that in order to backup the first VM a vProxy must include a sufficient number of configured sessions to enable concurrent backup of the first VM, and the first VM is executing a critical application, and
            - a recommendation, wherein the recommendation specifies whether or not a vProxy performing a backup for the first VM may be shared for performing other backup operations;
    - make a second determination that the first vProxy is not available to perform the first backup operation based on the first vProxy being labeled unhealthy or the first vProxy performing another backup operation, and wherein labelling the first vProxy comprises:
        - obtaining, by a health data collector, health data items associated with the first vProxy; and
        - assigning, based on the health data items and using the health data collector, the first vProxy to a low health cluster;
    - make a third determination, based on the second determination and using a vProxy information database and the vProxy Preference Map, that a second vProxy is available to perform the first backup operation based on the second vProxy being associated with the same backup capability as the first vProxy, and based on the health data collector assigning the second vProxy to a high health cluster; and
    - perform the first backup operation using the second vProxy.

16. The system of claim 15, wherein the backup operation analyzer is further configured to:
- receive a second request to perform a second backup operation for the first VM;
- make a fourth determination, using the vProxy preference map, that the first vProxy is assigned to the first VM based on the backup capability associated with the first vProxy;
- make a fifth determination that the first vProxy is available to perform the second backup operation; and
- perform, based on the fifth determination, the second backup operation using the first vProxy.

17. The system of claim 15, wherein the backup operation analyzer is further configured to:
- receive a second request to perform a second backup operation for the first VM;
- make a fourth determination, using the vProxy preference map, that the first vProxy is assigned to the first VM based on the backup capability associated with the first vProxy;
- make a fifth determination that the first vProxy is not available to perform the second backup operation;
- make a sixth determination, based on the fifth determination and using the vProxy information database, that no vProxy associated with the same backup capability as the first vProxy is available to perform the second backup operation;
- assign, based on the sixth determination, an alternate vProxy to perform the second backup operation; and
- perform the second backup operation using the alternate vProxy.

* * * * *